United States Patent
Zhang et al.

(10) Patent No.: US 11,552,695 B2
(45) Date of Patent: Jan. 10, 2023

(54) LAYER 1 SIGNAL TO INTERFERENCE PLUS NOISE RATIO (L1-SINR) MEASUREMENTS WITH NETWORK CONFIGURED MEASUREMENT GAPS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/353,554

(22) Filed: Jun. 21, 2021

(65) Prior Publication Data

US 2022/0069889 A1 Mar. 3, 2022

Related U.S. Application Data

(60) Provisional application No. 63/071,970, filed on Aug. 28, 2020.

(51) Int. Cl.
*H04B 7/08* (2006.01)
*H04B 7/06* (2006.01)
(Continued)

(52) U.S. Cl.
CPC ........... *H04B 7/088* (2013.01); *H04B 7/0695* (2013.01); *H04W 24/08* (2013.01); *H04W 24/10* (2013.01);
(Continued)

(58) Field of Classification Search
CPC ........ H04B 7/06; H04B 7/0695; H04B 7/088; H04B 17/345; H04L 5/0007;
(Continued)

(56) References Cited

U.S. PATENT DOCUMENTS

2019/0260485 A1   8/2019   Byun et al.
2020/0220585 A1   7/2020   John Wilson et al.
(Continued)

OTHER PUBLICATIONS

International Search Report and Written Opinion—PCT/US2021/041338—ISA/EPO—dated Oct. 20, 2021.

*Primary Examiner* — Habte Mered
*Assistant Examiner* — Prince A Mensah
(74) *Attorney, Agent, or Firm* — Patterson + Sheridan, LLP

(57) ABSTRACT

Aspects of the disclosure relate to a method for wireless communication at a user equipment (UE). In some aspects, the UE receives, from a base station, configuration information for performing beam pair selection measurements with respect to a subset of candidate beams at the UE. The beam pair selection measurements may include at least self-interference measurements at the UE between one or more transmit (Tx) beams and one or more receive (Rx) beams in the subset of candidate beams. The configuration information indicates measurement gaps between the self-interference measurements. The UE performs the beam pair selection measurements based on the configuration information and selects at least one pair of Tx/Rx beams based on the performed beam pair selection measurements. The UE transmits a report including the selected at least one pair of Tx/Rx beams to the base station.

30 Claims, 15 Drawing Sheets

(51) Int. Cl.
*H04B 17/345* (2015.01)
*H04W 24/08* (2009.01)
*H04W 24/10* (2009.01)
*H04L 5/00* (2006.01)

(52) U.S. Cl.
CPC .......... *H04B 17/345* (2015.01); *H04L 5/0007* (2013.01); *H04L 5/0048* (2013.01)

(58) Field of Classification Search
CPC ..... H04L 5/0048; H04L 5/005; H04L 5/0051; H04W 24/08; H04W 24/10; H04W 40/00; H04W 40/06
See application file for complete search history.

(56) References Cited

U.S. PATENT DOCUMENTS

2020/0343944 A1* 10/2020 Kim ...................... H04W 24/08
2022/0255611 A1* 8/2022 Chavva ................ H04B 17/382

\* cited by examiner

LAYER 1 SIGNAL TO INTERFERENCE PLUS NOISE RATIO (L1-SINR) MEASUREMENTS WITH NETWORK CONFIGURED MEASUREMENT GAPS

CROSS-REFERENCE TO RELATED APPLICATIONS

This Application claims the benefit of and priority to U.S. Provisional Patent Application No. 63/071,970, filed Aug. 28, 2020, the entire contents of which are incorporated herein by reference.

TECHNICAL FIELD

The technology discussed below relates generally to wireless communication systems, and more particularly, to Layer 1 signal-to-interference-plus-noise ratio (L1-SINR) measurements with network configured measurement gaps.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method of wireless communication at a user equipment (UE) is disclosed. The method may include receiving, from a base station, configuration information for performing beam pair selection measurements with respect to a subset of candidate beams at the UE, the beam pair selection measurements including at least self-interference measurements at the UE between one or more transmit (Tx) beams and one or more receive (Rx) beams in the subset of candidate beams, wherein the configuration information indicates measurement gaps between the self-interference measurements. The method may further include performing the beam pair selection measurements based on the configuration information, selecting at least one pair of Tx/Rx beams from the subset of candidate beams based on the performed beam pair selection measurements, and transmitting a report including the selected at least one pair of Tx/Rx beams to the base station.

In one example, a method of wireless communication at a base station (BS) is disclosed. The method may include transmitting, to a user equipment (UE), configuration information for beam pair selection measurements at the UE with respect to a subset of candidate beams at the UE, the beam pair selection measurements including at least self-interference measurements at the UE between one or more transmit (Tx) beams and one or more receive (Rx) beams in the subset of candidate beams, wherein the configuration information indicates measurement gaps between the self-interference measurements. The method may further include receiving, from the UE, a report including at least one pair of Tx/Rx beams selected by the UE based on the beam pair selection measurements.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

These and other aspects of the invention will become more fully understood upon a review of the detailed description in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
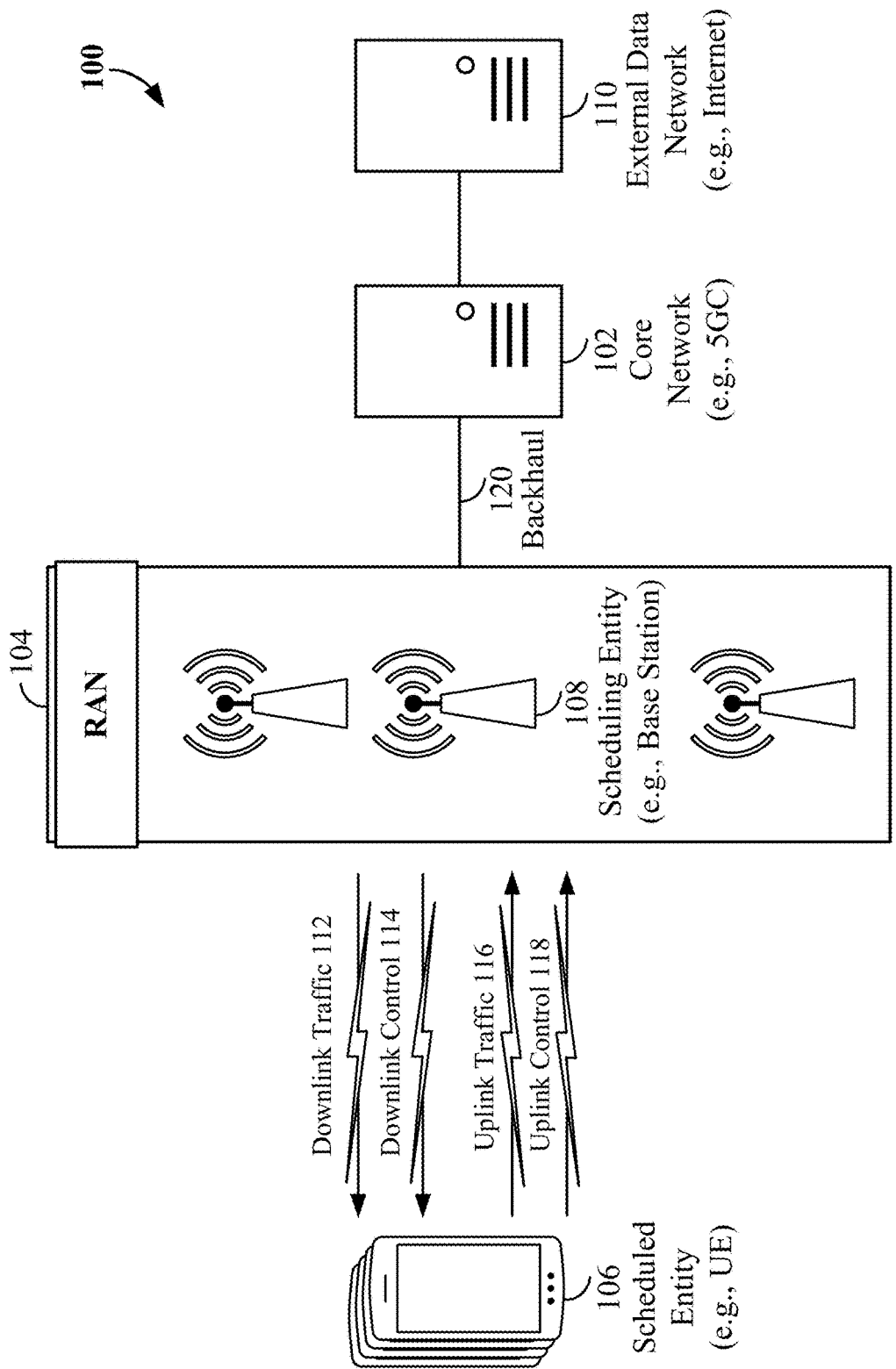
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip aspects and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.126 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2x (52.6 GHz-71 GHz), FR4 (71 GHz-114.25 GHz), and FR5 (114.25 GHz-275 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR2x, FR4, and/or FR5, or may be within the EHF band.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
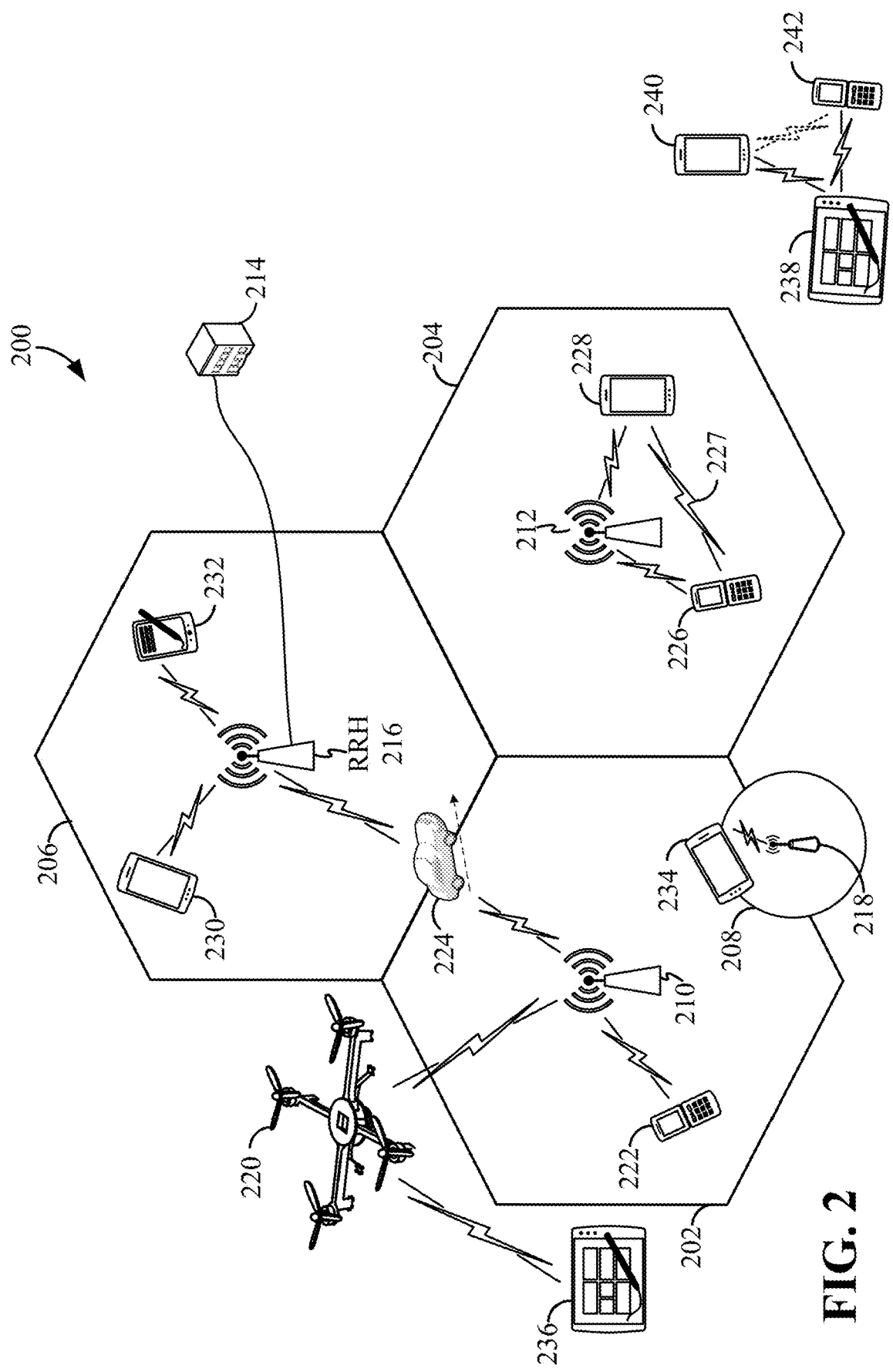
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

Within the RAN 200, the cells may include UEs that may be in communication with one or more sectors of each cell. Further, each base station 210, 212, 214, and 218 may be configured to provide an access point to a core network (e.g., as illustrated in FIG. 1 and/or 2) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1 and/or the UE 202 described above and illustrated in FIG. 2.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separated from one another using spatial division multiplexing.

Figure 3:
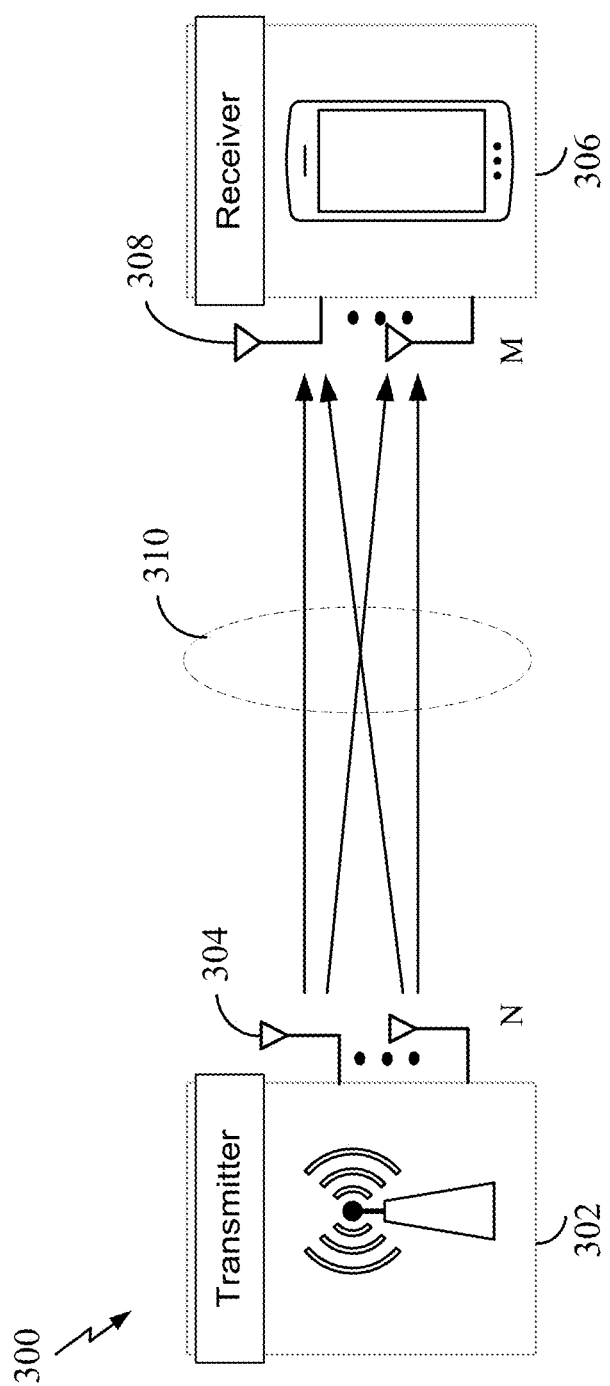
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
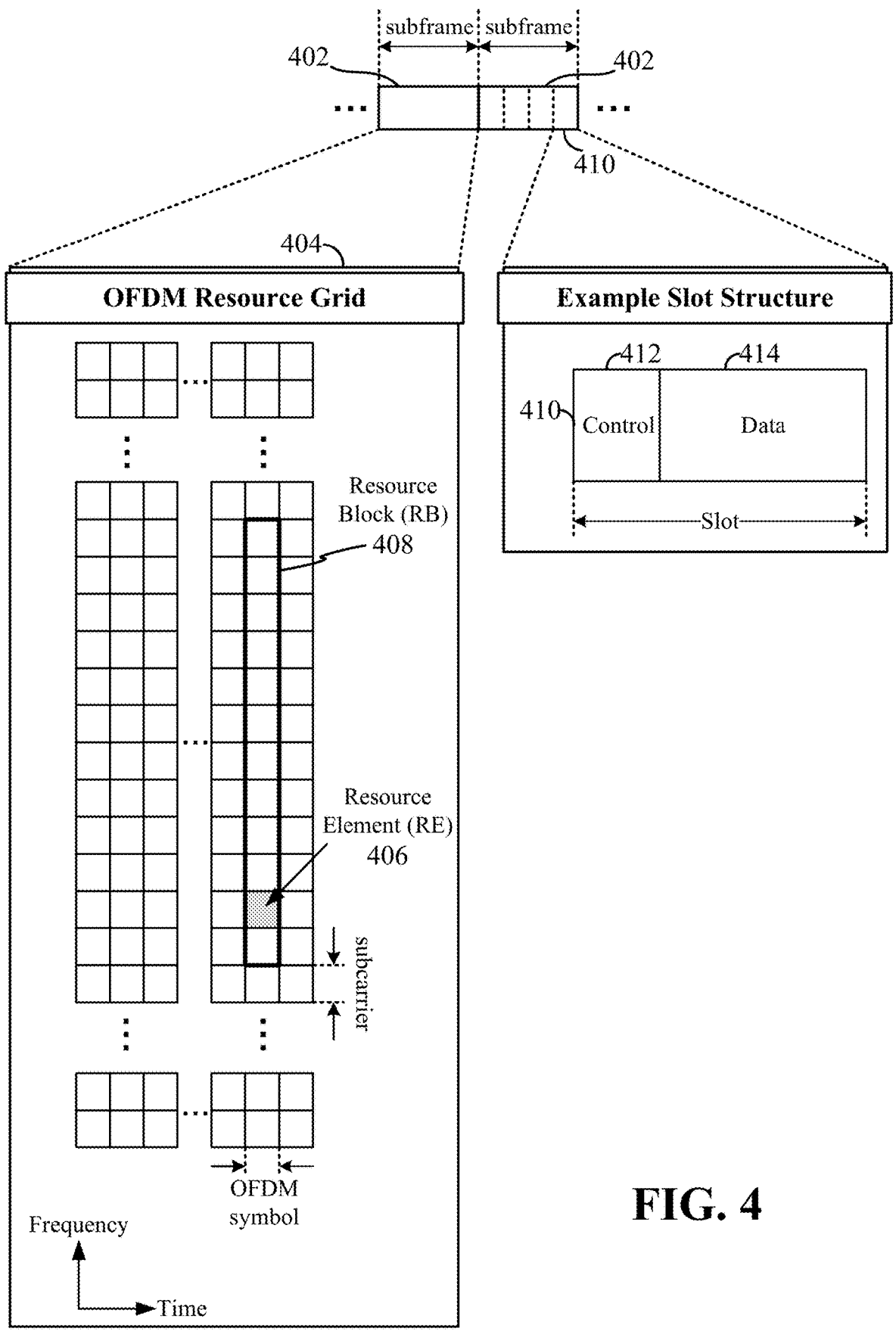
FIG. 4 is a schematic illustration of an organization of wireless resources in an air interface utilizing orthogonal frequency divisional multiplexing (OFDM) according to some aspects.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
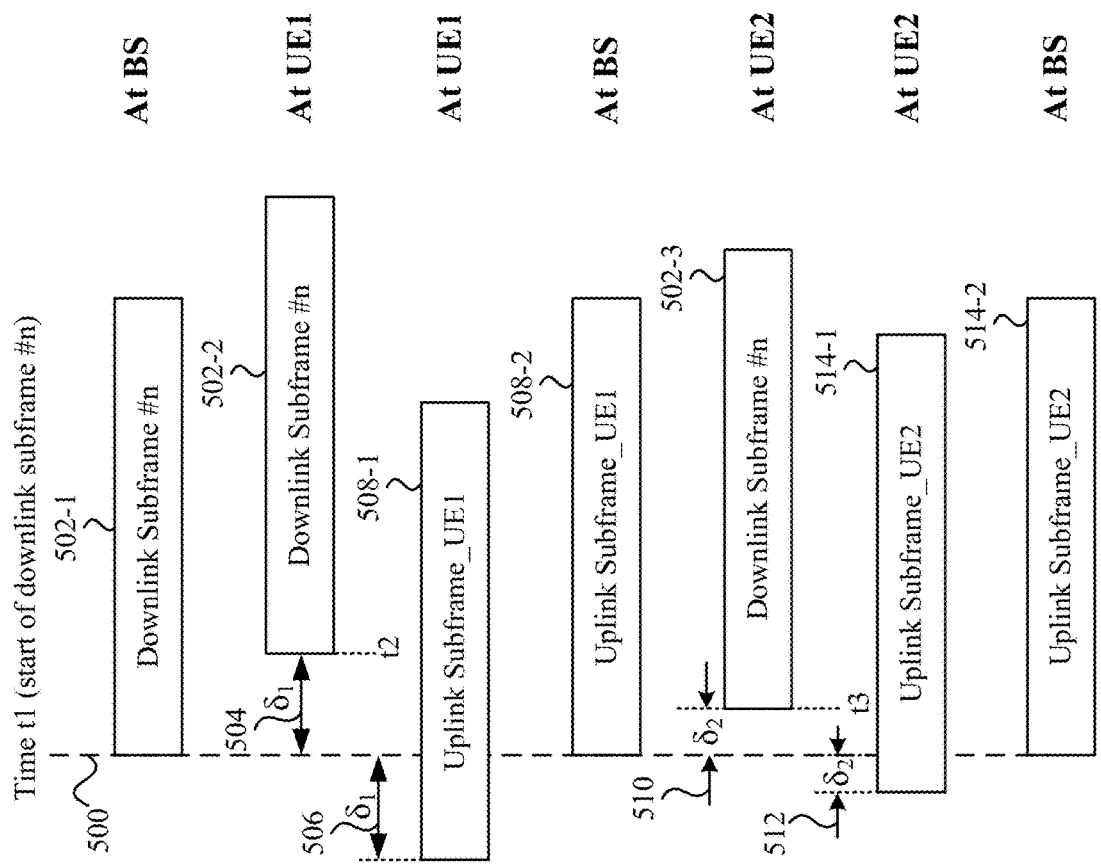
FIG. 5 illustrates example applications of timing advance offsets at a first UE (UE1) and a second UE (UE2).

FIG. 5 illustrates example applications of timing advance offsets at a first UE (UE1) and a second UE (UE2). A timing advance offset (also referred to as a timing advance (TA)) may be applied at a UE to ensure that the downlink and uplink subframes are synchronized at a base station (BS). In the example of FIG. 5, the UE1 may be located far from the BS and UE2 may be located close to the BS. The UE1 may experience a first propagation delay $\delta_1$ 504 on the downlink and the UE2 may experience a second propagation delay $\delta_2$ 510 on the downlink. Since UE1 is located far from the BS as compared to UE2, it may be assumed that $\delta_1 > \delta_2$. Therefore, when the BS transmits subframe #n (e.g., subframe #n 502-1) at time t1 500, the UE1 may receive the subframe #n (e.g., subframe #n 502-2) at time $t1+\delta_1$. The UE2 may receive the subframe #n (e.g., subframe #n 502-3) at time $t1+\delta_2$. Both UE1 and UE2 take the downlink subframe arrival (together with Timing Advance) as a reference to calculate uplink subframe timing.

The timing advance is equal to twice the propagation delay assuming that the same propagation delay value applies to both downlink and uplink directions. Therefore, UE1 may need to start it's uplink (e.g., uplink subframe 508-1) at $t2+2\delta_1$ (where t2 is the downlink reception time for UE1), whereas UE2 may need to start it's uplink (e.g., uplink subframe 514-1) at $t3+2\delta_2$ (where t3 is the downlink reception time for UE2) to ensure that both of the uplink transmissions (from UE1 and UE2) reach the BS at the same time (e.g., uplink subframes 508-2, 514-2). Accordingly, this means that both uplink and downlink subframes are time aligned.

If the timing advance is not applied, then the start of uplink transmission from UE2 for subframe #n+1 may overlap with the end of uplink transmission from UE1 for subframe #n. Assuming that same resource blocks are assigned to UE1 in subframe #n and UE2 in subframe #n+1, this overlap may create interference which causes reception failures at the BS. If a proper value of timing advance is applied, collisions of these subframes may be avoided.

Figure 6:
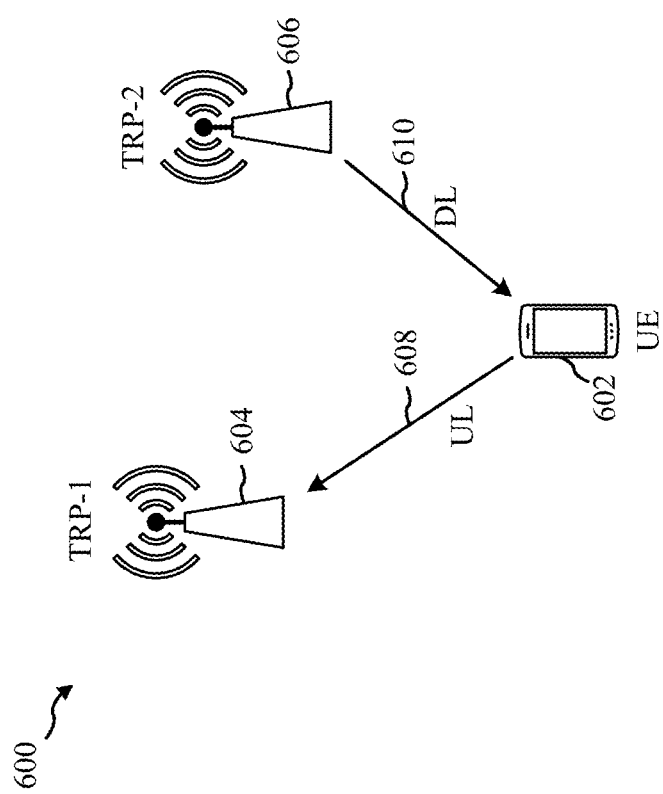
FIG. 6 is a diagram illustrating an example of full duplex (FD) communication.

FIG. 6 is a diagram illustrating an example 600 of full duplex (FD) communication. The example 600 of FIG. 6 includes a UE 602 and transmission and reception points (e.g., TRPs) 604, 606, where the UE 600 is sending UL transmissions (e.g., UL transmission 608) to TRP-1 604 and is receiving DL transmissions (e.g., DL transmission 610) from TRP-2 606. In the example 600 of FIG. 6, FD is enabled for the UE 600, but not for the TRPs 604, 606.

The present disclosure relates to improving the manner in which flexible TDD operates to allow for FD communication, simultaneous UL/DL transmission (e.g., in frequency range 2 (FR2)). Flexible TDD capability may be present at either a base station or UE, or both. For example, for a UE, UL transmission may be from one antenna panel and DL reception may be in another antenna panel. FD communication may be conditional on a beam separation of the UL beam and DL beam at the respective antenna panels. As such, improving the manner in which the selection of the UL beam and DL beam for FD communication is desirable. Utilizing FD communication may provide a reduction in latency, such that it may be possible to receive a DL signal in UL only slots, which may enable latency savings. In addition, FD communication may enhance spectrum efficiency per cell or per UE, and may allow for a more efficient utilization of resources.

The present disclosure further relates to improving timing alignment of DL and UL signals at a UE when operating in a full duplex mode, as well as improving timing alignment of DL and UL signals at both a UE and a base station (e.g., TRP) with respect to full duplex transmissions.

Figure 7:
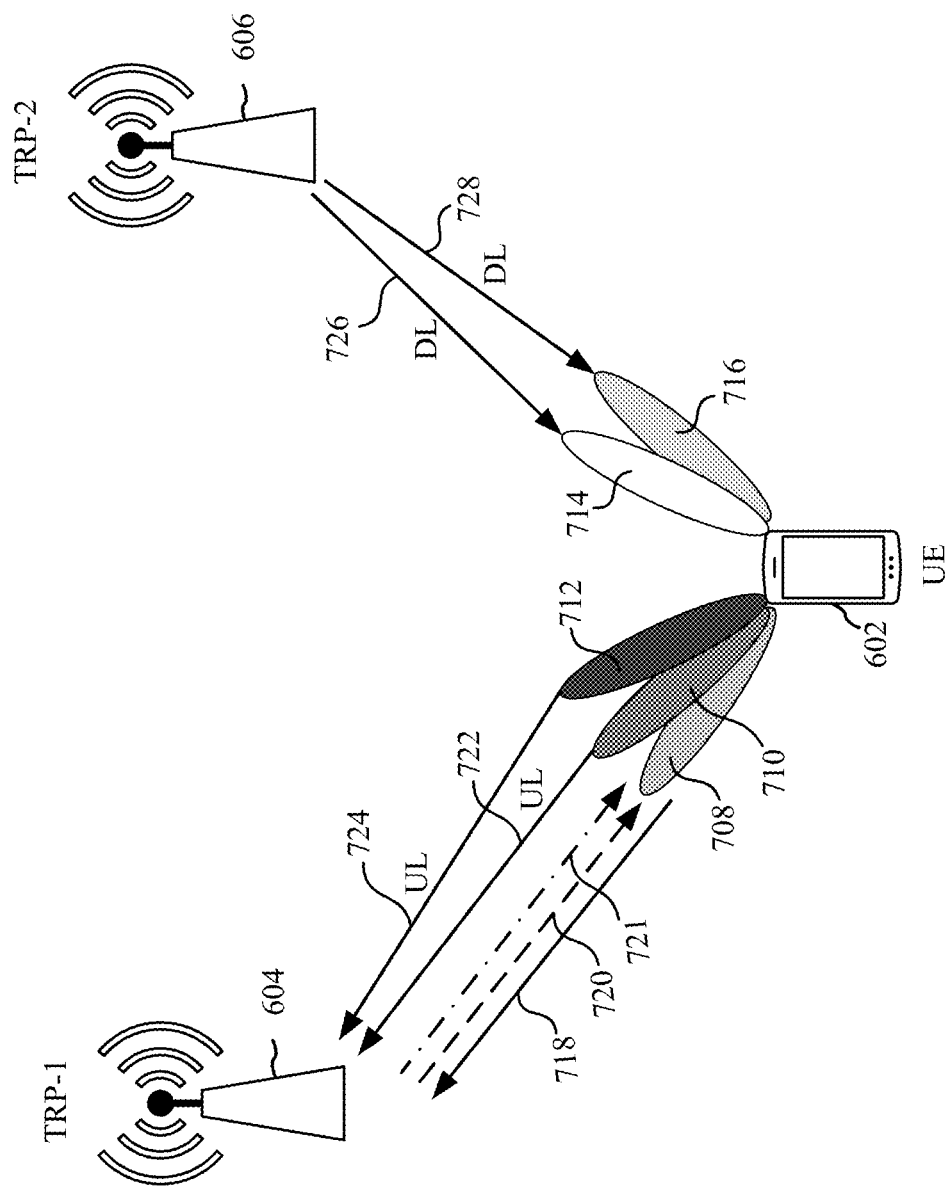
FIG. 7 illustrates a procedure for determining a reception timing difference between a reception time of a DL signal at a receive (Rx) beam of a UE and a reception time of a UL signal at the receive (Rx) beam of the UE, where the UL signal is transmitted from a transmit (Tx) beam of the UE.

FIG. 7 illustrates a procedure for determining a reception timing difference between a reception time of a DL signal at a receive (Rx) beam of a UE and a reception time of a UL signal at the receive (Rx) beam of the UE, where the UL signal is transmitted from a transmit (Tx) beam of the UE. As shown in FIG. 7, the UE 602 may transmit a physical random access channel (PRACH) message 718 to the TRP-1 604 from a first beam 708. The UE 602 may then receive a random access response (RAR) message 720 at the first beam 708 from the TRP-1 604. In some examples, the RAR message 720 may include a timing advance (TA) command. The TA command may include a timing advance to be applied by the UE 602 for uplink transmissions. The TRP-1 604 may then schedule Layer 1 Signal to Interference plus Noise Ratio (L1-SINR) measurements for the UE 602 via a configuration information message 721, where the L1-SINR measurements includes self-interference measurements (SIM) and DL and UL reception timing measurements for the UE 602. In some examples, as explained in detail herein, resources used for the self-interference measurements (SIM) may be used for the reception timing measurements, which may reduce signaling overhead.

In some aspects of the disclosure, the UE 602 may perform the L1-SINR measurements including the self-interference measurements (SIM) and DL and UL reception timing measurements by performing one or more DL/Rx and UL/Tx beam sweep operations. For example, as shown in FIG. 7, the UE 602 may have multiple transmit (Tx) beams (e.g., Tx beams 710, 712) and multiple receive (Rx) beams (e.g., Rx beams 714, 716). The UE 602 may perform a first beam sweep operation by transmitting a UL signal (e.g., a sounding reference signal (SRS)) from the Tx beam 710, and determining both the reception timing of the UL signal and the self-interference due to the UL signal at each of the Rx beams 714 and 716. The UE 602 may perform a second beam sweep operation by transmitting a UL signal (e.g., a sounding reference signal (SRS)) from the Tx beam 712, and determining both the reception timing of the UL signal and the self-interference due to the UL signal at each of the Rx beams 714 and 716. In some examples, the UE 602 may transmit each UL signal during a beam sweep operation by applying the timing advance received in the RAR message 720.

In some aspects of the disclosure, the UE 602 may determine a reception timing of a DL signal from the TRP-2 606 for each Rx beam. For example, the UE 602 may determine a reception timing of the DL signal 726 received at Rx beam 714 and may determine a reception timing of the DL signal 728 received at Rx beam 716. For example, the DL signals 726, 728 may be CSI-RS signals.

In the example of FIG. 7, the two Tx beams 710, 712 and the two Rx beams 714, 716 may form four beam pairs for FD communication at the UE. For example, the Tx beam 710 and the Rx beam 714 may form a first beam pair, the Tx beam 710 and the Rx beam 716 may form a second beam pair, the Tx beam 712 and the Rx beam 714 may form a third beam pair, and the Tx beam 712 and the Rx beam 716 may form a fourth beam pair.

Figure 8:
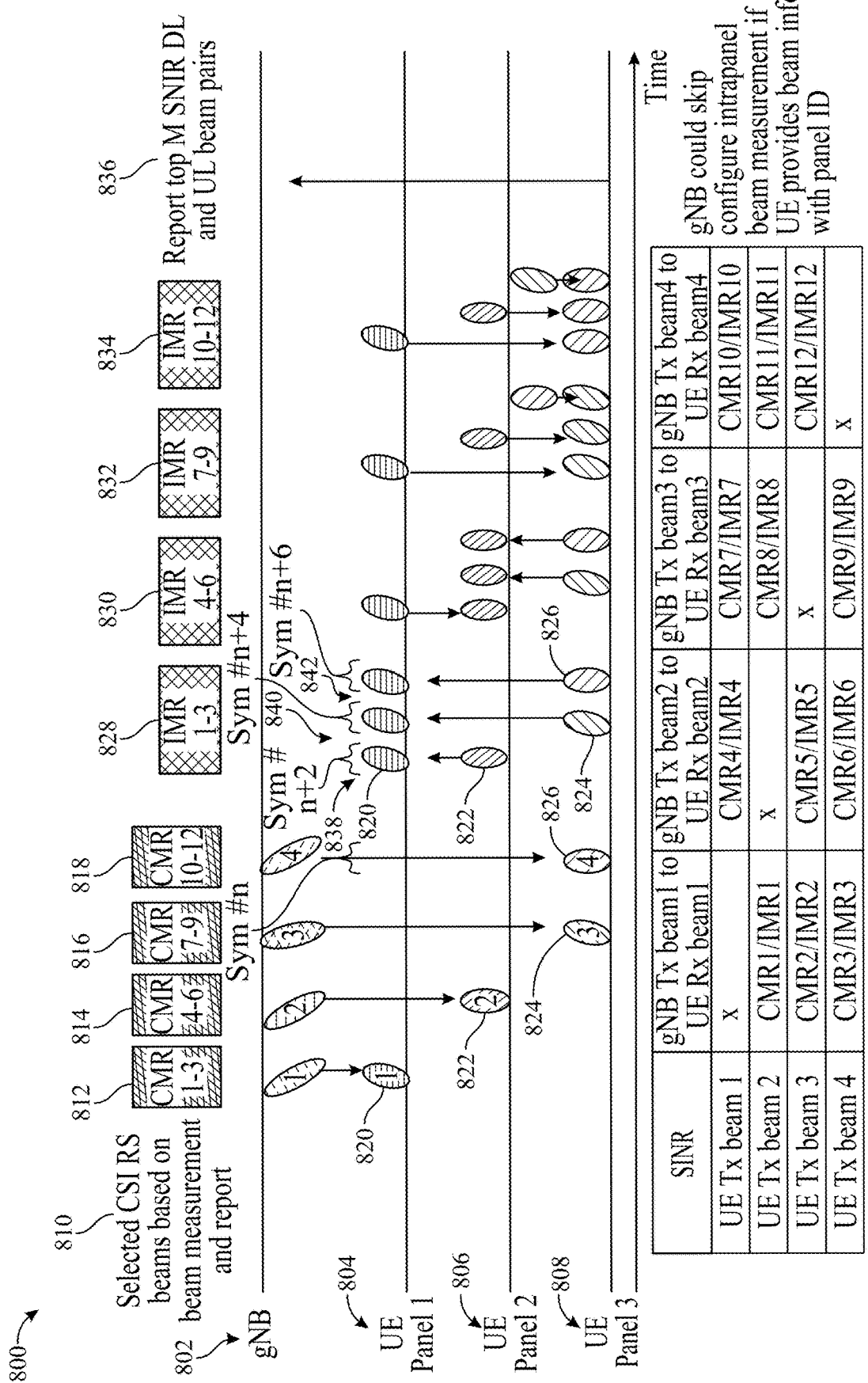
FIG. 8 is a diagram illustrating a beam measurement process in accordance with various aspects of the present disclosure.

Aspects Related to Layer 1 SINR Measurements with Network Configured Measurement Gaps FIG. 8 is a diagram 800 illustrating a beam measurement process in accordance with various aspects of the present disclosure. The diagram 800 of FIG. 8 includes a base station (BS) 802, and a UE comprising multiple UE panels (e.g., UE panel-1 804, UE panel-2 806, UE panel-3 808). The BS 802 and UE may be configured to select CSI-RS beams based on a beam measurement procedure (e.g., 810). The beam measurement procedure 810 may allow for the UE panels (e.g., 804, 806, 808) to measure CSI-RS signals from the BS 802 to determine which of the Rx beams are the best at the UE side. The determination of the best Rx beams may be based on the DL signal strength measured at the UE panels. Each Rx beam may be associated with a Tx CSI-RS beam at the BS 802. The beam measurement procedure 810 may allow for the BS 802 to transmit multiple CSI-RS resources to the UE panels in order to measure the DL channel quality or signal strength at the UE side. The UE may send a CSI-RS report to the BS 802 indicating the top Tx beams at the BS 802 with each associated top Rx beam at the UE side. The top Rx beams may be assumed to be the top Tx beams at the UE panels based on channel reciprocity. In some aspects, the UE may report the top four Tx beams. However, in some aspects, the UE may report more or less than the top four Tx beams. Upon the determination of the top four Tx beams with its associated top Rx beams at the UE, the UE may perform a self-interference measurement (SIM). The UE may also report the top four beams each with an associated panel ID of the UE, so that gNB can avoid configuring intra-panel SIM to save resource overhead.

To perform the SIM, the UE may transmit a transmission from the beam 820 with repetition (e.g. three times) from UE panel-1 804, such that beams 822, 824, and 826 may measure the amount of energy they receive from the transmission of the beam 820. The transmission from the beam 820 may be an uplink transmission to the BS 802, however, during the uplink transmission from beam 820 to the BS 802, some energy may be received at the beams of the other panels. Such energy may be due to side lobes or based on the configuration of the other panels. As such, the beams 822, 824, and 826 may measure the amount of self-interference caused by the transmission from the beam 820. This process repeats for all of the top four beams indicated in the CSI-RS report. For example, beam 822 may send a transmission with repetition (e.g. three times) such that beams 820, 824, and 826 measure the amount of self-interference caused by the transmission from beam 822. Upon the completion of the self-interference procedure and the channel measurement procedure, an indication 836 may be sent to the BS 802 indicating the top DL and UL beam pairs of the UE in a L1-SINR report via either the actual value or a largest value plus differential value of SINR. The DL and UL beams pairs selected as the top DL and UL beam pairs are beams that have passed a threshold for selection. In some aspects, the UE may report that no beams pass the threshold, such that no feasible beam and/or beam pair is present.

To perform the self-interference, a modified Layer 1 Signal to Interference plus Noise Ratio (L1-SINR) configuration and procedure may be utilized. L1-SINR may include two resource settings, the first resource setting which may be provided by the higher layer parameter "resourcesForChannelMeasurement" is configured to perform channel measurement (CM) via CSI-RS. The CM may measure the channel quality. The second resource which may be provided by either higher layer parameter "csi-IM-ResourcesForInterference" or the higher layer parameter "nzp-CSI-RS-ResourcesForInterference" and is configured to perform interference measurement (IM) via CSI-RS. The modified L1-SINR may be configured to utilize SRS, instead of CSI-RS, to perform the interference measurement (IM) procedure (e.g., for purposes of measuring self-interference at the UE). Each CSI-RS resource serving as a channel measurement resource (CMR) may be associated with one SRS resource serving as an interference measurement resource (IMR). The number of CSI-RS resources for CM may be equal to the number of SRS resources for interference measurement (IM). The CMR may also be re-used for the original L1-SINR beam management purposes. In addition, the IMR may also be reused for cross link interference (CLI) measurement purposes concurrently to measure the cross link interference at neighbor UEs using the same SRS resources used for SIM. In some aspects, the IMR configuration may be configured to define a full or reduced Tx power. For example, the reduced Tx power may be based on X dBm or X % of the full Tx power. The UE may use the configuration to scale up the calculated SINR accordingly.

With reference back to FIG. 8, the diagram 800 provides an example of the CM and IM using the modified L1-SINR configuration and procedure. The CM portion includes four CMRs 812, 814, 816, 818 such that the BS 802 is configured to transmit a CSI-RS to each of the top four Rx beams of the UE. For example, CMR 812 may be transmitted to Rx beam 820 of UE panel-1 804, CMR 814 may be transmitted to Rx beam 822 of UE panel-2 806, CMR 816 may be transmitted to Rx beam 824 of UE panel-3 808, and CMR 818 may be transmitted to Rx beam 826 of UE panel-3 808. The UE may measure the channel quality received at the UE by the corresponding Rx beams. The UE may store the channel quality measurements under the CMR to determine the SINR.

The IM portion includes the same or more amount of resources as in the CM portion, such that the CMRs are mapped to a corresponding IMR. For example, each CMR is associated with an IMR for the interference measurement. Each CMR can also be mapped to multiple IMRs for measuring the interference to the same Rx beam as the CMR but transmitting from different beams of different panels of the UE. The IM portion includes four IMRs 828, 830, 832, 834 and are mapped to a corresponding CMR. For example, CMR 812 may be mapped to IMR 828, CMR 814 may be mapped to IMR 830, CMR 816 may be mapped to IMR 832, and CMR 818 may be mapped to IMR 834. The IM portion allows for SIM to be performed. To perform SIM, the IMRs configure the UE with SRS resources. Each of the beams (e.g., 820, 822, 824, 826) may be configured to transmit an SRS when sending the uplink transmission for the SIM. The transmitted SRS may be utilized to measure SIM. In some aspects, the UE panel-1 804 may transmit the SRS at beam 820, such that beams 822, 824, and 826 may measure the amount of self-interference that is caused by the transmission from the beam 820. This process repeats for all the other beams 822, 824, 826. For example, beam 822 may send a transmission such that beams 820, 824, and 826 measure the amount of self-interference caused by the transmission from beam 822. Upon the completion of the CM and the SIM, an SINR may be determined.

The mapping of the CMRs and the IMRs allows for an SINR to be calculated based on the results of the CM and IM portions. The SINR may be determined based on a ratio of the CMR and the corresponding IMR, as shown in the table of FIG. 8.

The aspect of FIG. 8 provides an example of CM and IM resources being TDM, such that the CM portion and the IM portion occur at different times. In some aspects, a DL timing may be utilized for the CM, while a UL timing may be utilized for the IM. In such instances, the SINR may be calculated based on a ratio of CM and IM and noise (e.g., CM/(IM+noise)). Upon the calculations of the SINR, the UE may report the SINR results to the BS 802. The SINR results may include a report of the top SINR DL and UL beam pairs.

In the aspects described herein, the modified Layer 1 Signal to Interference plus Noise Ratio (L1-SINR) configuration may include a respective measurement gap between each of the self-interference measurements. In some aspects, the modified L1-SINR configuration information may further indicate an initial measurement gap between a channel measurement and one of the self-interference measurements. For example, as shown in FIG. 8, the BS 802 may configure an initial measurement gap 838 between a last CSI-RS transmission of CMR 818 and a first SRS transmission (e.g., from beam 822) of IMR 828. In this example, the BS 802 may further configure measurement gaps 840, 842 between each respective SRS transmission (e.g., from beams 824, 826) of IMR 828.

Each measurement gap may enable the UE to measure the reception time of an uplink transmission (e.g., an SRS) at a receive (Rx) beam of the UE when performing the SIM. For example, the measurement gap 838 may enable the UE to measure the reception time (at Rx beam 820) of the uplink transmission from the transmit (Tx) beam 822, the measurement gap 840 may enable the UE to measure the reception time (at Rx beam 820) of the uplink transmission from the transmit (Tx) beam 824, and the measurement gap 842 may enable the UE to measure the reception time (at Rx beam 820) of the uplink transmission from the transmit (Tx) beam 826. In some aspects of the disclosure, each measurement gap may further serve as a beam switching period.

In some aspects of the disclosure, the BS 802 may configure the duration of each measurement gap. In some examples, and as shown in FIG. 8, each measurement gap may be configured to have a duration of one orthogonal frequency-division multiplexing (OFDM) symbol. For example, the measurement gap 838 may be configured as the symbol n+1, the measurement gap 840 may be configured as the symbol n+3, and the measurement gap 842 may be configured as the symbol n+5. In other examples, each measurement gap may be configured to have a duration of multiple OFDM symbols. In some aspects of the disclosure, the BS 802 may configure two or more of the measurement gaps to have different durations. For example, the BS 802 may indicate the duration of the measurement gaps (e.g., measurement gaps 838, 840, 842) via a radio resource control (RRC) message, a medium access control (MAC) control element (MAC-CE), or in downlink control information (DCI). Although the example of FIG. 8 depicts the measurement gaps 838, 840, 842 for IMR 828, it should be understood that measurement gaps may also be configured for the remaining IMRs 830, 832, 834 (not shown for ease of illustration).

Figure 9:
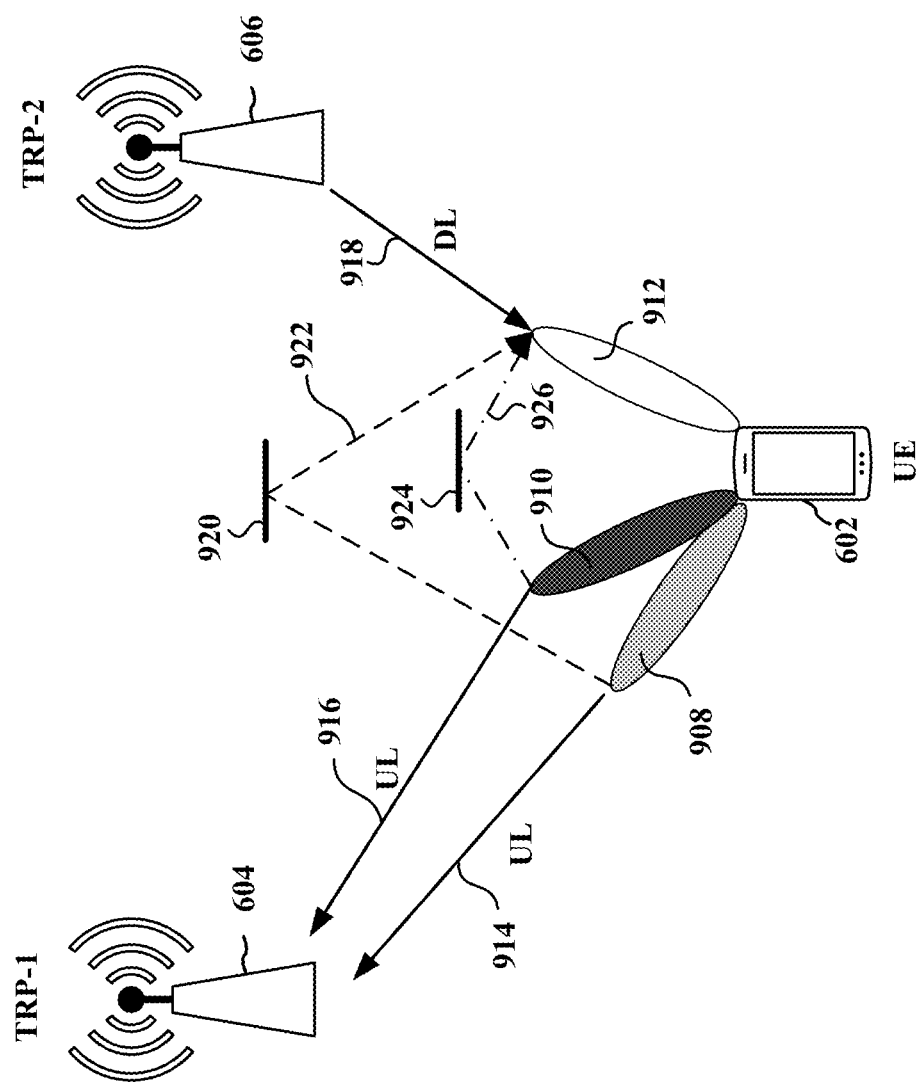
FIG. 9 is a diagram illustrating an example beam sweep operation for self-interference measurements (SIM) in accordance with various aspects of the present disclosure.

In some aspects of the disclosure, the UE may use a measured reception time of an uplink transmission (e.g., an SRS from a transmit (Tx) beam of the UE when performing the SIM) at a receive (Rx) beam of the UE to determine a reception timing difference between a DL signal and a UL signal for a given pair of Tx/Rx beams at the UE. For example, with reference to the example beam sweep operation for SIM shown in FIG. 9, the UE 602 may select a receive (Rx) beam 912 and first and second transmit (Tx) beams 908, 910. The UE 602 may receive a DL signal 918 from the TRP-2 606 at the Rx beam 912 and may determine a reception time of the DL signal 918. The UE 602 may then transmit a first UL signal 914 via the first Tx beam 908. As shown in FIG. 9, at least some of the energy of the first UL signal 914 (e.g., shown as the dashed line 922) may be directed back to Rx beam 912 via a first reflector 920. Therefore, the dashed line 922 in FIG. 9 may represent a self-interference signal from the transmission of the UL signal 914. The UE 602 may measure the reception time of the first UL signal 914 (e.g., self-interference signal 922) received at the Rx beam 912.

As further shown in FIG. 9, the UE 602 may transmit a second UL signal 916 via the second Tx beam 910. As shown in FIG. 9, at least some of the energy of the second UL signal 916 (e.g., shown as the dashed line 926) may be directed back to Rx beam 912 via a second reflector 924. Therefore, the dashed line 926 in FIG. 9 may represent a self-interference signal from the transmission of the UL signal 916. The UE 602 may measure the reception time of the second UL signal 916 (e.g., self-interference signal 926) received at the Rx beam 912. In some examples, the UE 602 may transmit the UL signals 914, 916 by applying a timing advance received from the TRP-1 604.

Figure 10:
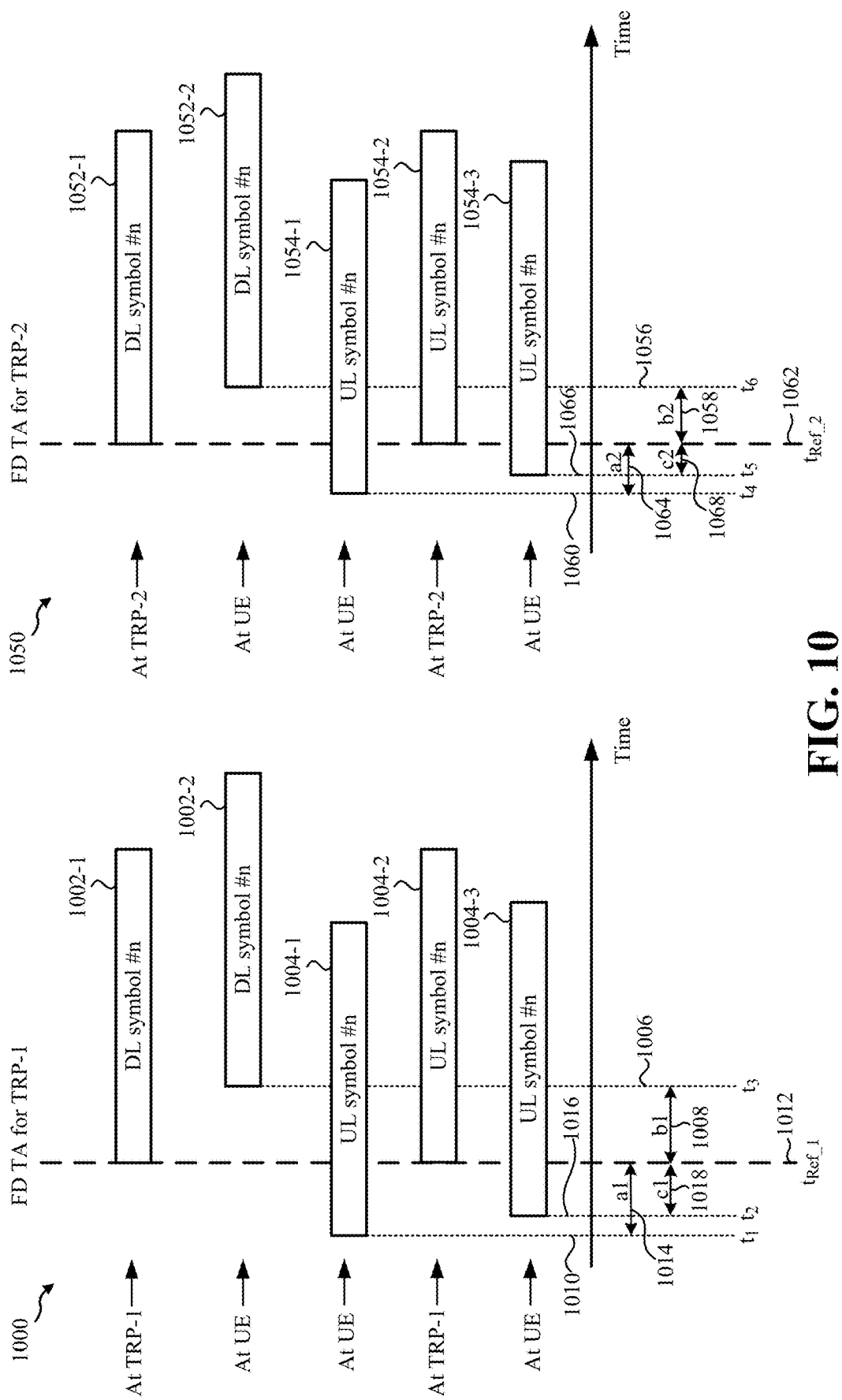
FIG. 10 shows a diagram illustrating an example timing of downlink (DL) and uplink (UL) signals between a UE and a first transmission and reception point (TRP) and a diagram illustrating an example timing of DL and UL signals between the UE and a second TRP in accordance with various aspects of the present disclosure.

FIG. 10 shows a diagram 1000 illustrating an example timing of DL and UL signals between the UE 602 and the TRP-1 604 and a diagram 1050 illustrating an example timing of DL and UL signals between the UE 602 and the TRP-2 606. With reference to FIG. 6 and the diagram 1000 in FIG. 10, the TRP-1 604 may transmit a DL signal 1002-1 in symbol #n at a first reference time (tRef_1) 1012. The UE 602 may receive the DL signal (shown as DL signal 1002-2 in FIG. 10) at a receive (Rx) beam at time t3 1006. The period between the time tRef_1 1012 and time t3 1006 is shown as the duration b1 1008. The duration b1 1008 may be considered to be the propagation delay between the TRP-1 604 and the UE 602.

As further shown in FIG. 10, the UE 602 may transmit a UL signal 1004-1 (with a timing advance (TA) received from the TRP-1 604) in a transmit (Tx) beam in symbol #n at a time t1. The period between the time t1 1010 and tRef_1 1012 is shown as the duration a1 1014. In the example of FIG. 10, the duration a1 1014 may be approximately equal to the duration b1 1008, such that the timing advance applied to the transmission of the UL signal 1004-1 is the sum of a1 1014 and b1 1008 (e.g., TATRP-1=a1+b1). The TRP-1 604 may receive the UL signal (shown as UL signal 1004-2 in FIG. 10) at the time tRef_1 1012. In the example of FIG. 10, the Rx beam may also receive the UL signal (shown as UL signal 1004-3 in FIG. 10) at time t2 1016. The UL signal 1004-3 may be considered a self-interference signal. The period between the time t2 1016 and tRef_1 1012 is shown as the duration c1 1018.

With reference to FIG. 6 and the diagram 1050 in FIG. 10, the TRP-2 606 may transmit a DL signal 1052-1 in symbol #n at a second reference time (tRef_2) 1012. The UE 602 may receive the DL signal (shown as DL signal 1052-2 in FIG. 10) at the receive (Rx) beam at time t6 1056. The period between the time tRef_2 1062 and time t6 1056 is shown as the duration b2 1058. The duration b1 1058 may be considered to be the propagation delay between the TRP-2 606 and the UE 602.

As further shown in FIG. 10, the UE 602 may transmit a UL signal 1054-1 (with a timing advance) in the transmit (Tx) beam in symbol #n at a time t4. The period between the time t4 1060 and tRef_2 1062 is shown as the duration a2 1064. In the example of FIG. 10, the duration a2 1064 may be approximately equal to the duration b2 1058, such that the timing advance applied to the transmission of the UL signal 1054-1 is the sum of a2 1064 and b2 1058 (e.g., TATRP-2=a2+b2). The TRP-2 606 may receive the UL signal (shown as UL signal 1054-2 in FIG. 10) at the time tRef_2 1062. In the example of FIG. 10, the Rx beam may also receive the UL signal (shown as UL signal 1054-3 in FIG. 10) at time t5 1066. The UL signal 1054-3 may be considered a self-interference signal. The period between the time t5 1066 and tRef_2 1062 is shown as the duration c2 1068.

Therefore, if a certain Tx beam is used for transmitting UL signals to the TRP-1 604 and a certain Rx beam is used for receiving DL signals from the TRP-2 606 in a full duplex mode, the reception timing difference between a DL and UL signal for a pair of Tx/Rx beams may be expressed as the sum of the durations c1 1018 and b2 1058. Alternatively stated, the reception timing difference between a DL and UL signal for a pair of Tx/Rx beams may be defined as the difference between the reception time (e.g., t6 1056) of the DL signal 1052-2 received at the Rx beam and the reception time (e.g., t2 1016) of the UL signal 1004-3 received at the Rx beam. In some examples, tRef_1 1012 and tRef_2 1062 may each represent a time zero from the perspective of the respective TRPs 604, 606.

In some aspects of the disclosure, the UE 602 may select a pair of Tx/Rx beams at the UE for full duplex communication if the reception timing difference between a DL signal and a UL signal at the UE is below a threshold. In some examples, the threshold may be set to a cyclic prefix duration.

With the timing aligned for UL and DL signals, structured DL and UL transmissions may avoid signal leakage into sub-bands, partially overlapped FDMed full duplex bands, and orthogonal UL and DL demodulation reference signals (DMRSs). Moreover, for a UE transmitting different reference signals (e.g., CSI-RS and SRS) using FDM, the previously described time alignment of UL and DL signals may avoid signal leakage may into other frequency bands.

Figure 11:
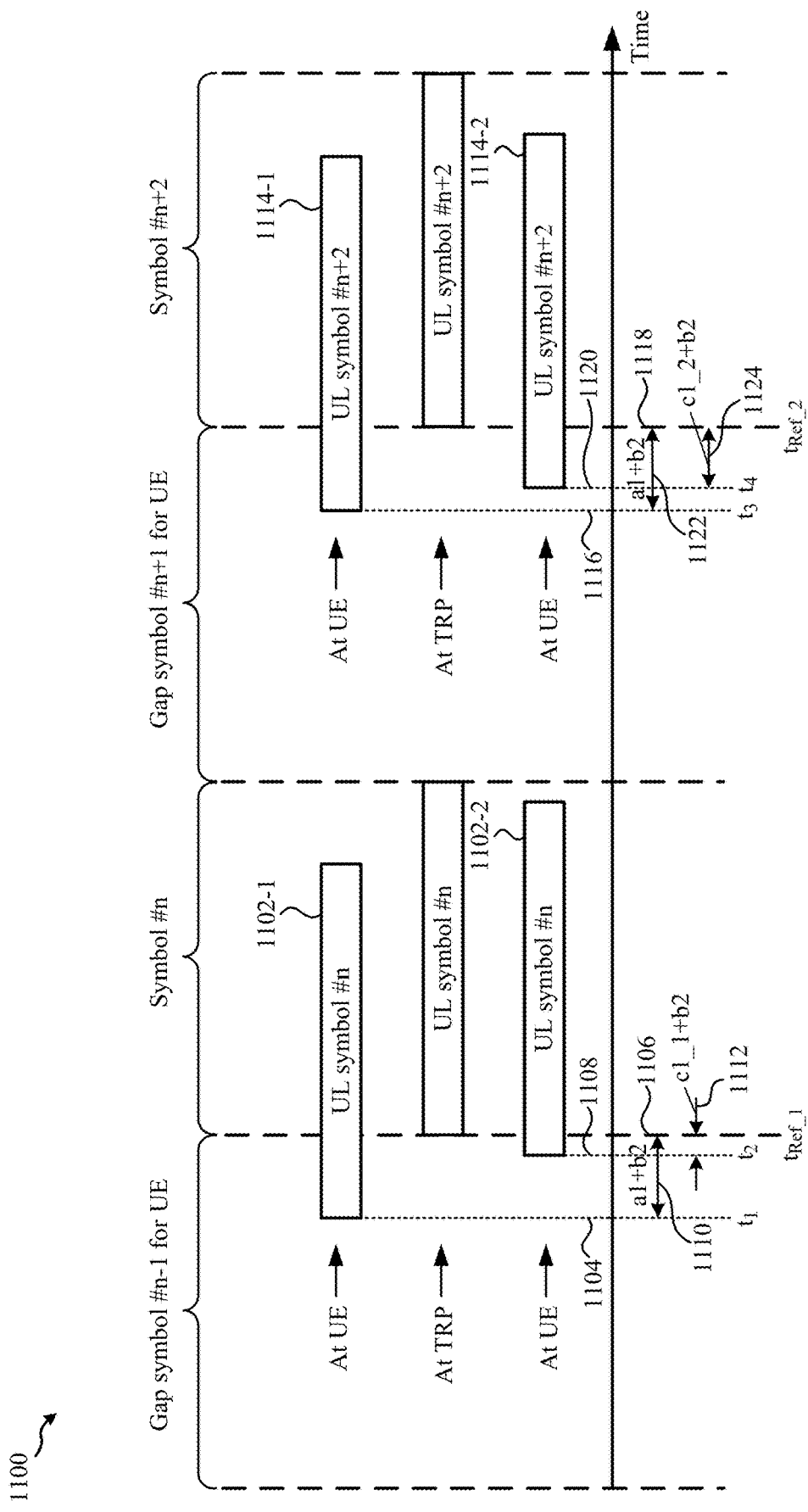
FIG. 11 illustrates an example procedure for measuring different reception timing differences for different pairs of Tx/Rx beams at a UE in accordance with various aspects of the present disclosure.

FIG. 11 illustrates an example procedure 1100 for measuring different reception timing differences for different pairs of Tx/Rx beams at a UE (e.g., UE 602). In one example scenario, with reference to FIG. 9, the UE 602 may select the receive (Rx) beam 912 for receiving DL signals from the TRP-2 606 in full duplex mode. The UE 602 may then perform a beam sweep operation using one or more Tx beams (e.g., Tx beams 908, 910) by transmitting UL signals (e.g., SRS) from the Tx beams at designated times, such as the measurement gaps described herein.

As shown in FIG. 11, the TRP-1 604 and/or TRP-2 606 may configure a respective measurement gap between UL transmissions (e.g., SRS transmissions) for SIM, such as the gap symbol #n−1 and the gap symbol #n+1. Accordingly, with reference to FIGS. 9 and 11, the UE 602 may transmit the first UL signal 914 from the first Tx beam 908 for a symbol #n (e.g., UL symbol #n 1102-1) during a measurement gap. The measurement gap may be the gap symbol #n−1 shown in FIG. 11. In FIG. 11, it should be noted that the UE 602 transmits the first UL signal 914 at time t1 1104 with a timing advance 1110 expressed as a1+b2. For example, a1 may be the duration a1 1014 shown in FIG. 10 and b2 may be the duration b2 1058 shown in FIG. 10. For example, the timing advance 1110 may include the duration b2 1058 to achieve alignment with the reference time established for the DL Rx beam 912 (e.g., the time t6 1056 at which a DL signal is received at the UE 602 from the TRP-2 606 via the Rx beam 912).

In the example of FIG. 11, the UE 602 may measure the reception time (e.g., t2 1108) of the first UL signal 914 (e.g., self-interference signal 922) received at the Rx beam 912. The UE 602 may determine the period between the time t2 1108 and tRef_1 1106, which is shown as the duration 1112 (e.g., c1_1+b2). The duration 1112 may represent the reception timing difference between a UL signal from the first Tx beam 908 and a DL signal at the Rx beam 912. In some aspects, the gap symbol #n−1 enables the UE 602 to more accurately measure the time t2 1108 at the Rx beam 912 since no DL signals may interfere with the UL signal transmitted during the gap symbol #n-1.

As further shown in FIG. 11, the UE 602 may transmit the second UL signal 916 from the second Tx beam 910 for a symbol #n+2 (e.g., UL symbol #n+2 1114-1) during a measurement gap. The measurement gap may be the gap symbol #n+1 shown in FIG. 11. In FIG. 11, it should be noted that the UE 602 transmits the second UL signal 916 at time t3 1116 with a timing advance 1122 expressed as a1+b2, which may be the same as the timing advance 1110.

In the example of FIG. 11, the UE 602 may measure the reception time (e.g., t4 1120) of the second UL signal 916 (e.g., self-interference signal 926) received at the Rx beam 912. The UE 602 may determine the period between the time t4 1120 and tRef_2 1118, which is shown as the duration 1124 (e.g., c1_2+b2). The duration 1124 may represent the reception timing difference between a UL signal from the second Tx beam 910 and a DL signal at the Rx beam 912.

In some aspects, the gap symbol #n+1 enables the UE 602 to more accurately measure the time t4 1120 at the Rx beam 912 since no DL signals may interfere with the UL signal transmitted during the gap symbol #n+1.

In the example scenario described with references to FIGS. 9 and 11, the duration 1112 (e.g., c1_1+b2) may be less that the duration 1124 (e.g., c1_2+b2). This is because the first reflector 920 is situated farther away from the UE 602 than the second reflector 924, thereby causing a larger propagation delay in the UL signal transmissions arriving at the Rx beam 912. Therefore, the duration c1_1 resulting from the farther reflector (e.g., the first reflector 920) may be larger than the duration c1_2 resulting from the closer reflector (e.g., the second reflector 924). Therefore, in some examples, since the reception timing difference (e.g., c1_1+b2 1112) between the Tx/Rx beams 908, 912 may be less than the reception timing difference (e.g., c1_2+b2 1124) between the Tx/Rx beams 910, 912, the Tx/Rx beams 908, 912 may experience less self-interference and may provide better performance during full duplex communication.

In some aspects of the disclosure, the UE 602 may compare the respective reception timing differences for the pairs of Tx/Rx beams (e.g., Tx/Rx beams 908, 912, Tx/Rx beams 910, 912) to a threshold value and may identify the pairs of Tx/Rx beams having reception timing differences that are below the threshold value. In some examples, the threshold value may be a cyclic prefix duration.

In some aspects of the disclosure, the UE 602 can estimate a reception timing difference for a Tx/Rx beam pair at the UE with respect to an uplink base station and a downlink base station according to the expression $Trx\_d1\_i\_m - Trx\_ul\_j\_n$ and may estimate whether $Trx\_d1\_i\_m - Trx\_ul\_j\_n$ is less than a threshold (e.g., a cyclic prefix duration). For example, the term $Trx\_d1\_i\_m$ may represent the reception time (e.g., at the UE 602) of a DL signal transmitted from a downlink base station (e.g., a downlink transmission point) having an index i via a beam m on that downlink base station, and the term $Trx\_ul\_j\_n$ may represent the reception time (e.g., at the UE 602) of a UL signal transmitted to an uplink base station (e.g., an uplink transmission point) having an index j via a beam n on that uplink base station.

Figure 12:
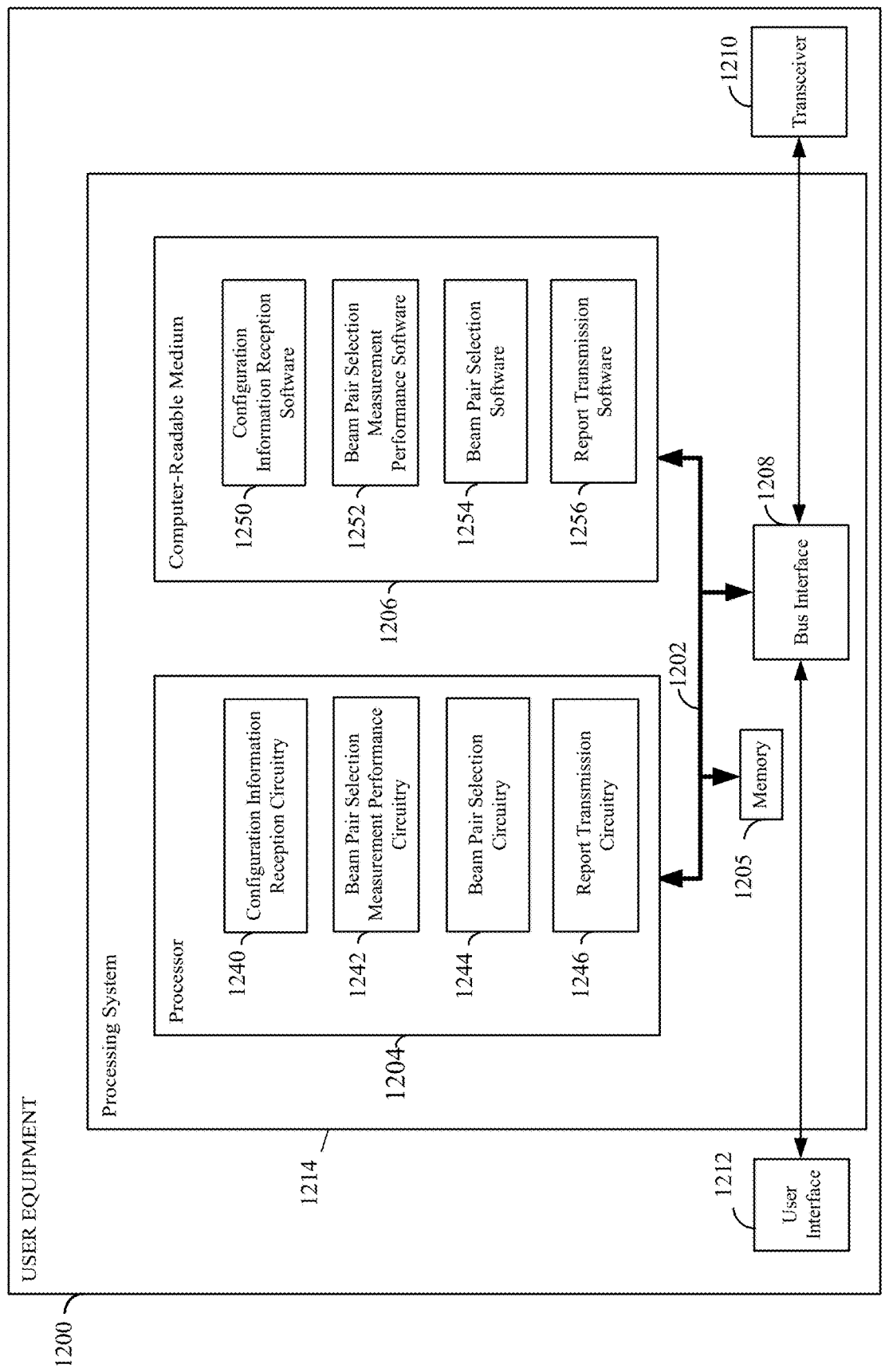
FIG. 12 is a block diagram conceptually illustrating an example of a hardware implementation for a user equipment (UE) according to some aspects of the disclosure.

FIG. 12 is a block diagram illustrating an example of a hardware implementation for a user equipment (UE) 1200 employing a processing system 1214. For example, the UE 1200 may correspond to any of the UEs shown and described above in reference to FIGS. 1-11.

The UE 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1200 may be configured to perform any one or more of the functions described herein. That is, the processor 1204, as utilized in the UE 1200, may be used to implement any one or more of the processes and procedures described below and illustrated in FIG. 14.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 links together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further.

A bus interface 1208 provides an interface between the bus 1202 and a transceiver 1210. The transceiver 1210 provides a means for communicating with various other apparatus over a transmission medium (e.g., air interface). Depending upon the nature of the apparatus, a user interface 1212 (e.g., keypad, display, touch screen, speaker, microphone, control knobs, etc.) may also be provided. Of course, such a user interface 1212 is optional, and may be omitted in some examples.

The processor 1204 is responsible for managing the bus 1202 and general processing, including the execution of software stored on the computer-readable medium 1206. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. In some examples, the computer-readable medium 1206 may be part of the memory 1205. Those skilled in the art will recognize how best to implement the described functionality presented throughout this disclosure depending on the particular application and the overall design constraints imposed on the overall system.

In some aspects of the disclosure, the processor 1204 may include circuitry configured for various functions. For example, the processor 1204 may include configuration information reception circuitry 1240 configured to receive, from a base station, configuration information for performing beam pair selection measurements with respect to a subset of candidate beams (e.g., beams 820, 822, 824, 826 and/or beams 908, 910, 912) at the UE. In some aspects, the subset of candidate beams may be the top candidate beams used for the sweeping through SRS. For example, the UE may determine the top candidate beams by performing a channel measurement process on the candidate beams.

The beam pair selection measurements may include at least self-interference measurements at the UE between one or more transmit (Tx) beams and one or more receive (Rx) beams in the subset of candidate beams. The configuration information indicates measurement gaps between the self-interference measurements.

The processor 1204 may further include beam pair selection measurement performance circuitry 1242 configured to perform the beam pair selection measurements based on the configuration information.

The processor 1204 may further include beam pair selection circuitry 1244 configured to select at least one pair of Tx/Rx beams from the subset of candidate beams based on the performed beam pair selection measurements.

The processor 1204 may further include report transmission circuitry 1246 configured to transmit a report including the selected at least one pair of Tx/Rx beams to the base station.

In one or more examples, the computer-readable storage medium 1206 may include configuration information reception software 1250 configured to receive, from a base station, configuration information for performing beam pair selection measurements with respect to a subset of candidate beams at the UE. The beam pair selection measurements may include at least self-interference measurements at the UE between one or more transmit (Tx) beams and one or more receive (Rx) beams in the subset of candidate beams. The configuration information indicates measurement gaps between the self-interference measurements. For example, the configuration information reception software 1250 may be configured to implement one or more of the functions described below in relation to FIG. 14, including, e.g., block 1402.

In one or more examples, the computer-readable storage medium 1206 may further include beam pair selection measurement performance software 1252 configured to perform the beam pair selection measurements based on the configuration information. For example, the beam pair selection measurement performance software 1252 may be configured to implement one or more of the functions described below in relation to FIG. 14, including, e.g., block 1404.

In one or more examples, the computer-readable storage medium 1206 may further include beam pair selection software 1254 configured to select at least one pair of Tx/Rx beams from the subset of candidate beams based on the performed beam pair selection measurements. For example, the beam pair selection software 1254 may be configured to implement one or more of the functions described below in relation to FIG. 14, including, e.g., block 1406.

In one or more examples, the computer-readable storage medium 1206 may further include report transmission software 1256 configured to transmit a report including the selected at least one pair of Tx/Rx beams to the base station. For example, the report transmission software 1256 may be configured to implement one or more of the functions described below in relation to FIG. 14, including, e.g., block 1408.

Figure 13:
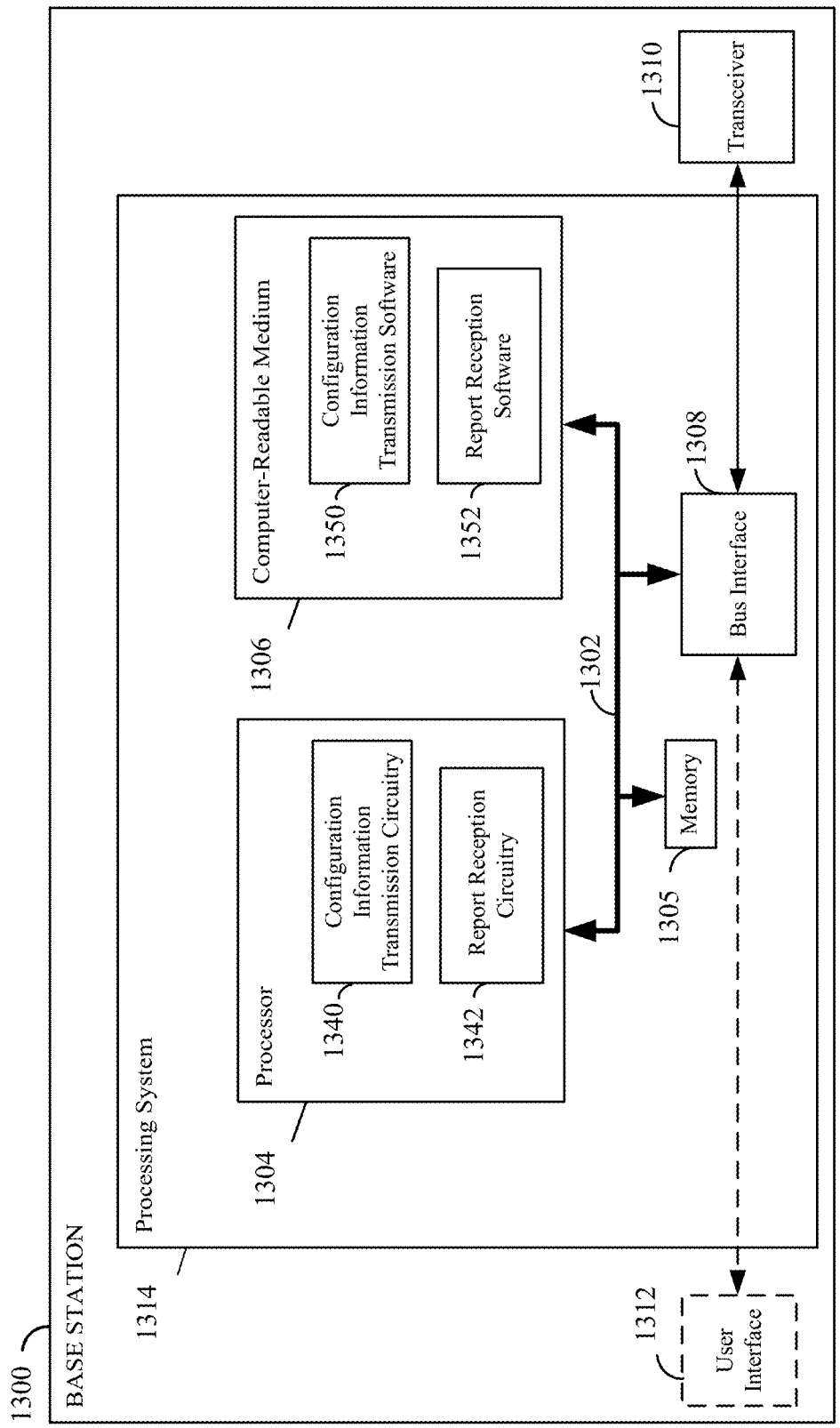
FIG. 13 is a block diagram conceptually illustrating an example of a hardware implementation for a base station (BS) according to some aspects of the disclosure.

FIG. 13 is a conceptual diagram illustrating an example of a hardware implementation for an exemplary base station 1300 employing a processing system 1314. For example, the base station 1300 may be the TRP-1 604, the TRP-2 606, or the base station 802 as illustrated in FIGS. 6-9.

In accordance with various aspects of the disclosure, an element, or any portion of an element, or any combination of elements may be implemented with a processing system 1314 that includes one or more processors 1304. That is, the processor 1304, as utilized in the base station 1300, may be used to implement any one or more of the processes described below. The processing system 1314 may be substantially the same as the processing system 1214 illustrated in FIG. 12, including a bus interface 1308, a bus 1302, memory 1305, a processor 1304, a computer-readable medium 1306, and a transceiver 1310.

In some aspects of the disclosure, the processor 1304 may include circuitry configured for various functions. For example, the processor 1304 may include configuration information transmission circuitry 1340 configured to transmit, to a user equipment (UE), configuration information for beam pair selection measurements at the UE with respect to a subset of candidate beams at the UE. The beam pair selection measurements may include at least self-interference measurements at the UE between one or more transmit (Tx) beams and one or more receive (Rx) beams in the subset of candidate beams. The configuration information indicates measurement gaps between the self-interference measurements.

The processor 1304 may further include report reception circuitry 1342 configured to receive, from the UE, a report including at least one pair of Tx/Rx beams selected by the UE based on the beam pair selection measurements.

In one or more examples, the computer-readable storage medium 1306 may include configuration information transmission software 1350 configured to transmit, to a user equipment (UE), configuration information for beam pair selection measurements at the UE with respect to a subset of candidate beams at the UE. The beam pair selection measurements may include at least self-interference measurements at the UE between one or more transmit (Tx) beams and one or more receive (Rx) beams in the subset of candidate beams. The configuration information indicates measurement gaps between the self-interference measurements. For example, the configuration information transmission software 1350 may be configured to implement one or more of the functions described below in relation to FIG. 15, including, e.g., block 1502.

In one or more examples, the computer-readable storage medium 1306 may further include report reception software 1352 configured to receive, from the UE, a report including at least one pair of Tx/Rx beams selected by the UE based on the beam pair selection measurements. For example, the report reception software 1352 may be configured to implement one or more of the functions described below in relation to FIG. 15, including, e.g., block 1504.

Figure 14:
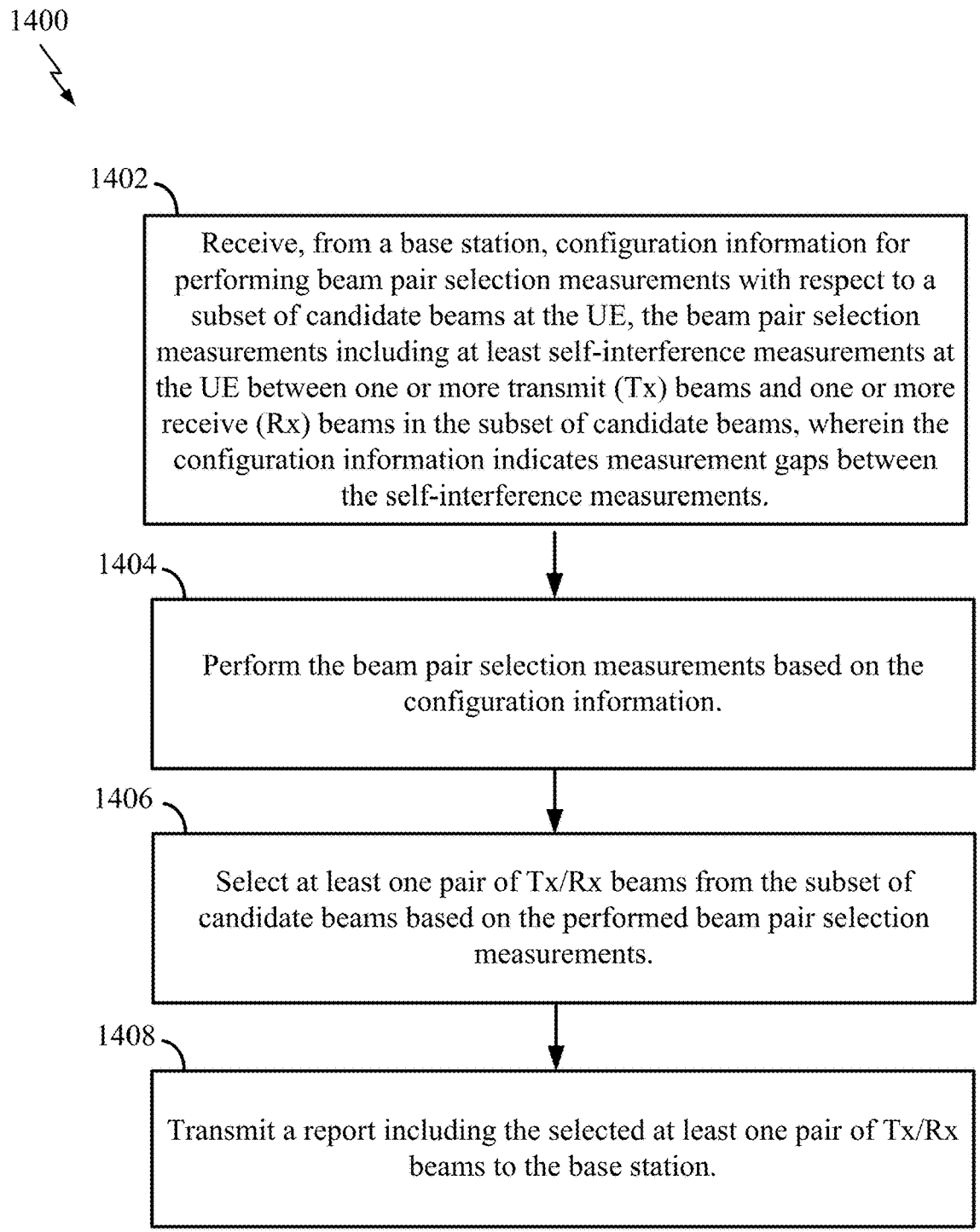
FIG. 14 is a flow chart illustrating an exemplary process for wireless communication at a UE according to some aspects of the disclosure.

FIG. 14 is a flow chart 1400 of a method for wireless communication at a UE in accordance with some aspects of the present disclosure. As described below, some or all illustrated features may be omitted in a particular implementation within the scope of the present disclosure, and some illustrated features may not be required for implementation of all aspects. In some examples, the process 1400 may be carried out by the UE 602 illustrated in FIGS. 6, 7 and 9. In some examples, the process 1400 may be carried out by any suitable apparatus or means for carrying out the functions or algorithm described below.

At block 1402, the UE receives, from a base station, configuration information (e.g., configuration information message 721) for performing beam pair selection measurements with respect to a subset of candidate beams at the UE. The beam pair selection measurements may include at least self-interference measurements at the UE between one or more transmit (Tx) beams and one or more receive (Rx) beams in the subset of candidate beams (e.g., the SRS transmissions from Tx beams 822, 824, 826 to Rx beam 820 as shown in FIG. 8). The configuration information indicates measurement gaps (e.g., measurement gaps 840, 842) between the self-interference measurements. For example, the configuration information reception circuitry 1240, together with the transceiver 1210, shown and described above in connection with FIG. 12 may receive, from a base station, the configuration information for performing beam pair selection measurements with respect to a subset of candidate beams at the UE.

At block 1404, the UE performs the beam pair selection measurements based on the configuration information. For example, the beam pair selection measurements may include the beam sweep operation for SIM described with reference to FIG. 9. In some aspects of the disclosure, the UE performs the beam pair selection measurements by determining a respective reception timing difference between a downlink (DL) signal and an uplink (UL) signal for each of one or more pairs of Tx/Rx beams from the subset of candidate beams. One example of a reception timing difference may be the previously described sum of the durations c1 1018 and b2 1058 in FIG. 10. For example, the beam pair selection measurement performance circuitry 1242, together with the transceiver 1210, shown and described above in connection with FIG. 12 may perform the beam pair selection measurements based on the configuration information.

At block 1406, the UE selects at least one pair of Tx/Rx beams from the subset of candidate beams based on the performed beam pair selection measurements. In some aspects of the disclosure, the UE selects the at least one pair of Tx/Rx beams by comparing the respective reception timing difference between the DL signal and the UL signal for each of the one or more pairs of Tx/Rx beams to a threshold value, and identifying pairs of Tx/Rx beams in the one or more pairs of Tx/Rx beams for which the respective reception timing difference between the DL signal and the UL signal is below the threshold value. In some examples, the UE may be configured to set the threshold value to a cyclic prefix duration.

In some aspects, the UE determines the respective reception timing difference for each of the one or more pairs of Tx/Rx beams by determining a first reception time of a downlink transmission at a receive (Rx) beam of a pair of Tx/Rx beams in the one or more pairs of Tx/Rx beams, transmitting an uplink transmission from a transmit (Tx) beam of the pair of Tx/Rx beams in the one or more pairs of Tx/Rx beams, determining a second reception time of the uplink transmission at the receive (Rx) beam of the pair of Tx/Rx beams in the one or more pairs of Tx/Rx beams, and determining a duration between the first reception time and the second reception time. In some examples, the uplink transmission includes a sounding reference signal (SRS). For example, the uplink transmission may be transmitted based on a timing advance received from the base station. In some aspects, the second reception time of the uplink transmission is determined during one of the measurement gaps. In some aspects, the second reception time of the uplink transmission is determined during one of the measurement gaps.

In some aspects of the disclosure, the UE selects the at least one pair of Tx/Rx beams by identifying a pair of Tx/Rx beams in the one or more pairs of Tx/Rx beams based on at least one constraint applied to the respective reception timing difference between the DL signal and the UL signal. For example, the beam pair selection circuitry 1244 shown and described above in connection with FIG. 12 may select at least one pair of Tx/Rx beams from the subset of candidate beams based on the performed beam pair selection measurements.

In some aspects of the disclosure, the configuration information further indicates a duration for one or more of the measurement gaps, where each of the self-interference measurements are performed via a sounding reference signal (SRS) transmission. In some examples, the duration may be indicated as one or more orthogonal frequency-division multiplexing (OFDM) symbols. In some aspects, the duration is indicated to the UE in a radio resource control (RRC) message, a medium access control (MAC) control element (MAC-CE), or in downlink control information (DCI). In some aspects, the configuration information further indicates an initial measurement gap between a channel measurement and one of the self-interference measurements.

At block 1408, the UE transmits a report including the selected at least one pair of Tx/Rx beams to the base station. For example, the report transmission circuitry 1246, together with the transceiver 1210, shown and described above in connection with FIG. 12 may transmit a report including the selected at least one pair of Tx/Rx beams to the base station.

Figure 15:
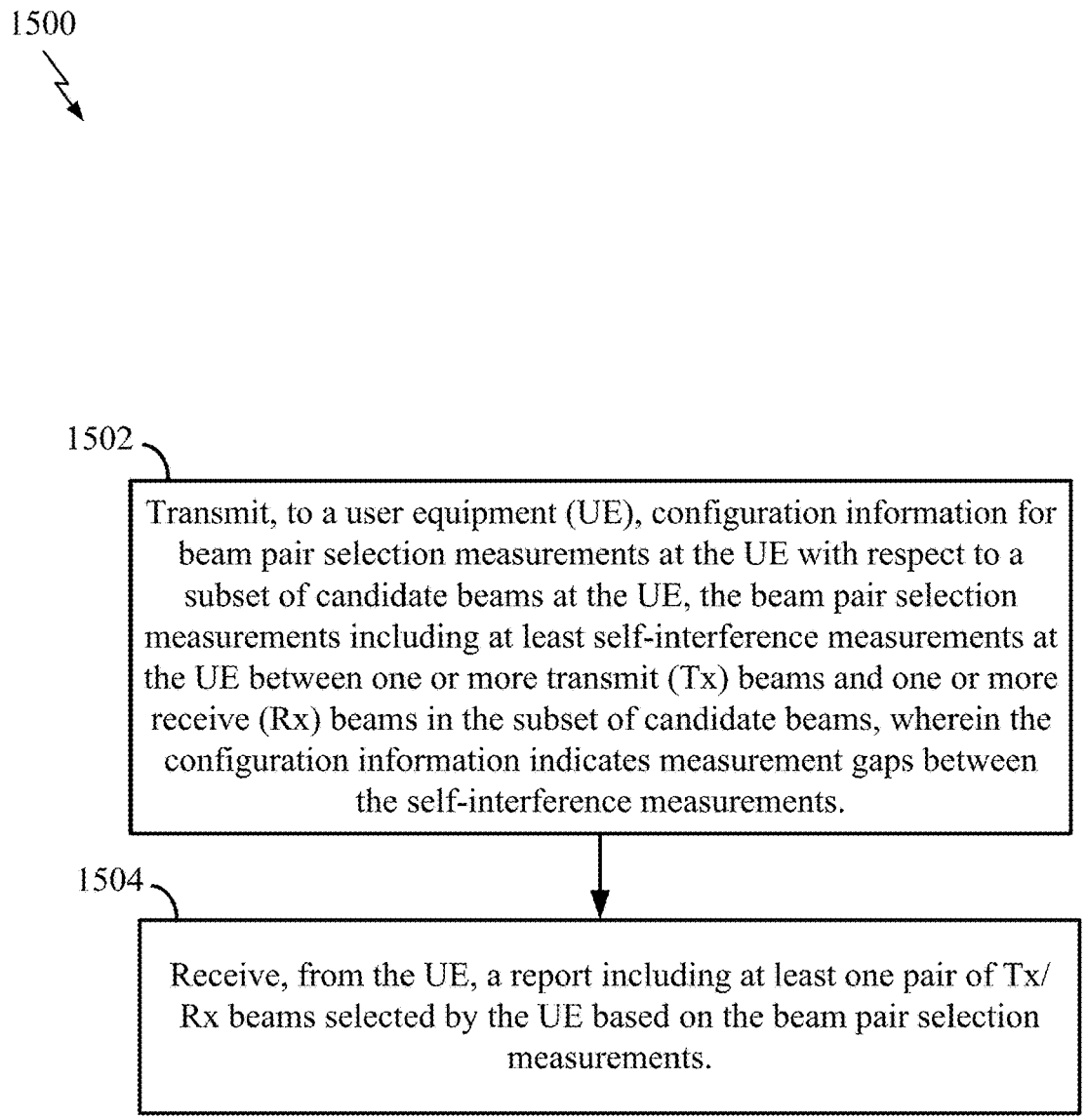
FIG. 15 is a flow chart illustrating an exemplary process for wireless communication at a BS according to some aspects of the disclosure.

FIG. 15 is a flow chart 1500 of a method for wireless communication at a base station in accordance with some aspects of the present disclosure. As described below, some or all illustrated features may be omitted in a particular implementation within the scope of the present disclosure, and some illustrated features may not be required for implementation of all aspects. In some examples, the process 1500 may be carried out by the TRP-1 604, the TRP-2 606, or the base station 802 as illustrated in FIGS. 6-9. In some examples, the process 1500 may be carried out by any suitable apparatus or means for carrying out the functions or algorithm described below.

At block 1502, the BS transmits, to a user equipment (UE), configuration information for beam pair selection measurements at the UE with respect to a subset of candidate beams at the UE. The beam pair selection measurements may include at least self-interference measurements at the UE between one or more transmit (Tx) beams and one or more receive (Rx) beams in the subset of candidate beams. The configuration information indicates measurement gaps between the self-interference measurements. For example, the configuration information transmission circuitry 1340, together with the transceiver 1310, shown and described above in connection with FIG. 13 may transmit, to a user equipment (UE), configuration information for beam pair selection measurements at the UE with respect to a subset of candidate beams at the UE.

In some aspects, each of the measurement gaps enables the UE to determine a respective reception timing difference between a downlink (DL) signal and an uplink (UL) signal for each of one or more pairs of Tx/Rx beams from the subset of candidate beams. The BS refrains from scheduling downlink transmissions for the UE during the measurement gaps. In some aspects, at least one of the measurement gaps enables the UE to perform a beam switching operation. In some aspects, the configuration information further indicates a duration for one or more of the measurement gaps. In some examples, the duration is indicated as one or more orthogonal frequency-division multiplexing (OFDM) symbols. In some aspects, the BS indicates the duration to the UE in a radio resource control (RRC) message, a medium access control (MAC) control element (MAC-CE), or in downlink control information (DCI).

At block 1504, the BS receives, from the UE, a report including at least one pair of Tx/Rx beams selected by the UE based on the beam pair selection measurements. For example, the report reception circuitry 1342, together with the transceiver 1310, shown and described above in connection with FIG. 13 may BS receive, from the UE, a report including at least one pair of Tx/Rx beams selected by the UE based on the beam pair selection measurements.

In one configuration, the apparatus 1200 for wireless communication includes means for receiving, from a base station, configuration information for performing beam pair selection measurements with respect to a subset of candidate beams at the apparatus, the beam pair selection measurements including at least self-interference measurements at the apparatus between one or more transmit (Tx) beams and one or more receive (Rx) beams in the subset of candidate beams, wherein the configuration information indicates measurement gaps between the self-interference measurements. The apparatus 1200 further includes means for performing the beam pair selection measurements based on the configuration information, means for selecting at least one pair of Tx/Rx beams from the subset of candidate beams based on the performed beam pair selection measurements, and means for transmitting a report including the selected at least one pair of Tx/Rx beams to the base station.

In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1-11, and utilizing, for example, the processes and/or algorithms described herein in relation to FIG. 14.

In one configuration, the apparatus 1300 for wireless communication includes means for transmitting, to a user equipment (UE), configuration information for beam pair selection measurements at the UE with respect to a subset of candidate beams at the UE. The beam pair selection measurements may include at least self-interference measurements at the UE between one or more transmit (Tx) beams and one or more receive (Rx) beams in the subset of candidate beams. The configuration information indicates measurement gaps between the self-interference measurements. The apparatus 1300 further includes means for receiving, from the UE, a report including at least one pair of Tx/Rx beams selected by the UE based on the beam pair selection measurements.

In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1-11, and utilizing, for example, the processes and/or algorithms described herein in relation to FIG. 15.

EXAMPLE CLAUSES

Implementation examples are described in the following numbered clauses:

Clause 1: A method of wireless communication for a user equipment (UE), comprising: receiving, from a base station, configuration information for performing beam pair selection measurements with respect to a subset of candidate beams at the UE, the beam pair selection measurements including at least self-interference measurements at the UE between one or more transmit (Tx) beams and one or more receive (Rx) beams in the subset of candidate beams, wherein the configuration information indicates measurement gaps between the self-interference measurements; performing the beam pair selection measurements based on the configuration information; selecting at least one pair of Tx/Rx beams from the subset of candidate beams based on the performed beam pair selection measurements; and transmitting a report including the selected at least one pair of Tx/Rx beams to the base station.

Clause 2. The method of Clause 1, wherein the performing the beam pair selection measurements comprises determining a respective reception timing difference between a downlink (DL) signal and an uplink (UL) signal for each of one or more pairs of Tx/Rx beams from the subset of candidate beams.

Clause 3. The method of Clause 2, wherein the selecting the at least one pair of Tx/Rx beams comprises: comparing the respective reception timing difference between the DL signal and the UL signal for each of the one or more pairs of Tx/Rx beams to a threshold value; and identifying pairs of Tx/Rx beams in the one or more pairs of Tx/Rx beams for which the respective reception timing difference between the DL signal and the UL signal is below the threshold value.

Clause 4. The method of Clause 3, wherein the threshold value is set to a cyclic prefix duration.

Clause 5. The method of any one of Clauses 2-4, wherein the selecting the at least one pair of Tx/Rx beams further comprises identifying a pair of Tx/Rx beams in the one or more pairs of Tx/Rx beams based on at least one constraint applied to the respective reception timing difference between the DL signal and the UL signal.

Clause 6. The method of any one of Clauses 2-5, wherein the determining the respective reception timing difference for each of the one or more pairs of Tx/Rx beams comprises: determining a first reception time of a downlink transmission at a receive (Rx) beam of a pair of Tx/Rx beams in the one or more pairs of Tx/Rx beams; transmitting an uplink transmission from a transmit (Tx) beam of the pair of Tx/Rx beams in the one or more pairs of Tx/Rx beams; determining a second reception time of the uplink transmission at the receive (Rx) beam of the pair of Tx/Rx beams in the one or more pairs of Tx/Rx beams; and determining a duration between the first reception time and the second reception time.

Clause 7. The method of Clause 6, wherein the uplink transmission includes a sounding reference signal (SRS).

Clause 8. The method of any one of Clauses 6-7, wherein the second reception time of the uplink transmission is determined during one of the measurement gaps.

Clause 9. The method of Clause 8, wherein the one of the measurement gaps enables the UE to perform a beam switching operation.

Clause 10. The method of any one of Clauses 6-9, wherein the uplink transmission is transmitted based on a timing advance received from the base station.

Clause 11. The method of any one of Clauses 1-10, wherein the configuration information further indicates a duration for one or more of the measurement gaps, wherein each of the self-interference measurements are performed via a sounding reference signal (SRS) transmission.

Clause 12. The method of Clause 11, wherein the duration is indicated as one or more orthogonal frequency-division multiplexing (OFDM) symbols.

Clause 13. The method of Clause 12, wherein the duration is indicated to the UE in a radio resource control (RRC) message, a medium access control (MAC) control element (MAC-CE), or in downlink control information (DCI).

Clause 14. The method of any one of Clauses 1-13, wherein the configuration information further indicates an initial measurement gap between a channel measurement and one of the self-interference measurements.

Clause 15: A method of wireless communication for a base station (BS), comprising: transmitting, to a user equipment (UE), configuration information for beam pair selection measurements at the UE with respect to a subset of candidate beams at the UE, the beam pair selection measurements including at least self-interference measurements at the UE between one or more transmit (Tx) beams and one or more receive (Rx) beams in the subset of candidate beams, wherein the configuration information indicates measurement gaps between the self-interference measurements; and receiving, from the UE, a report including at least one pair of Tx/Rx beams selected by the UE based on the beam pair selection measurements.

Clause 16. The method of Clause 15, wherein each of the measurement gaps enables the UE to determine a respective reception timing difference between a downlink (DL) signal and an uplink (UL) signal for each of one or more pairs of Tx/Rx beams from the subset of candidate beams.

Clause 17. The method of any one of Clauses 15-16, further comprising refraining from scheduling downlink transmissions for the UE during the measurement gaps.

Clause 18. The method of any one of Clauses 15-17, wherein at least one of the measurement gaps enables the UE to perform a beam switching operation.

Clause 19. The method of any one of Clauses 15-18, wherein the configuration information further indicates a duration for one or more of the measurement gaps.

Clause 20. The method of Clause 19, wherein the duration is indicated as one or more orthogonal frequency-division multiplexing (OFDM) symbols.

Clause 21. The method of Clause 20, wherein the duration is indicated to the UE in a radio resource control (RRC) message, a medium access control (MAC) control element (MAC-CE), or in downlink control information (DCI).

Clause 22. The method of any one of Clauses 15-21, wherein the configuration information further indicates an initial measurement gap between a channel measurement and one of the self-interference measurements.

Clause 23: A processing system, comprising: a memory comprising computer-executable instructions; one or more processors configured to execute the computer-executable instructions and cause the processing system to perform a method in accordance with any one of Clauses 1-22.

Clause 24: A processing system, comprising means for performing a method in accordance with any one of Clauses 1-22.

Clause 25: A non-transitory computer-readable medium comprising computer-executable instructions that, when executed by one or more processors of a processing system, cause the processing system to perform a method in accordance with any one of Clauses 1-22.

Clause 26: A computer program product embodied on a computer-readable storage medium comprising code for performing a method in accordance with any one of Clauses 1-22.

Additional Considerations

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "obtaining" may include one or more actions including, but not limited to, receiving, generating, determining, or any combination thereof.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication for a user equipment (UE), comprising:
   receiving, from a base station, configuration information for performing beam pair selection measurements with respect to a subset of candidate beams at the UE, the beam pair selection measurements including at least self-interference measurements at the UE between one or more transmit (Tx) beams and one or more receive (Rx) beams in the subset of candidate beams, wherein the configuration information indicates measurement gaps between the self-interference measurements, wherein the configuration information further indicates an initial measurement gap between a channel measurement and one of the self-interference measurements;
   performing the beam pair selection measurements based on the configuration information;
   selecting at least one pair of Tx/Rx beams from the subset of candidate beams based on the performed beam pair selection measurements; and
   transmitting a report including the selected at least one pair of Tx/Rx beams to the base station.

2. The method of claim 1, wherein the performing the beam pair selection measurements comprises determining a respective reception timing difference between a downlink (DL) signal and an uplink (UL) signal for each of one or more pairs of Tx/Rx beams from the subset of candidate beams.

3. The method of claim 2, wherein the selecting the at least one pair of Tx/Rx beams comprises:
   comparing the respective reception timing difference between the DL signal and the UL signal for each of the one or more pairs of Tx/Rx beams to a threshold value; and identifying pairs of Tx/Rx beams in the one or more pairs of Tx/Rx beams for which the respective reception timing difference between the DL signal and the UL signal is be low the threshold value.

4. The method of claim 3, wherein the threshold value is set to a cyclic prefix duration.

5. The method of claim 2, wherein the selecting the at least one pair of Tx/Rx beams further comprises identifying a pair of Tx/Rx beams in the one or more pairs of Tx/Rx beams based on at least one constraint applied to the respective reception timing difference between the DL signal and the UL signal.

6. The method of claim 2, wherein the determining the respective reception timing difference for each of the one or more pairs of Tx/Rx beams comprises:
   determining a first reception time of a downlink trans mis s ion at a receive (Rx) beam of a pair of Tx/Rx beams in the one or more pairs of Tx/Rx beams;
   transmitting an uplink transmission from a transmit (Tx) beam of the pair of Tx/Rx beams in the one or more pairs of Tx/Rx beams;
   determining a second reception time of the uplink transmission at the receive (Rx) beam of the pair of Tx/Rx beams in the one or more pairs of Tx/Rx beams; and
   determining a duration between the first reception time and the second reception time.

7. The method of claim 6, wherein the uplink transmission includes a sounding reference signal (SRS).

8. The method of claim 6, wherein the second reception time of the uplink transmission is determined during one of the measurement gaps.

9. The method of claim 8, wherein the one of the measurement gaps enables the UE to perform a beam switching operation.

10. The method of claim 6, wherein the uplink transmission is transmitted based on a timing advance received from the base station.

11. The method of claim 1, wherein the configuration information further indicates a duration for one or more of the measurement gaps, wherein each of the self-interference measurements are performed via a sounding reference signal (SRS) transmission.

12. The method of claim 11, wherein the duration is indicated as one or more orthogonal frequency-division multiplexing (OFDM) symbols.

13. The method of claim 12, wherein the duration is indicated to the UE in a radio resource control (RRC) message, a medium access control (MAC) control element (MAC-CE), or in downlink control information (DCI).

14. An apparatus for wireless communication, comprising:
   at least one processor;
   a transceiver communicatively coupled to the at least one processor; and
   a memory communicatively coupled to the at least one processor,
   wherein the processor is configured to:
      receive, from a base station, configuration information for performing beam pair selection measurements with respect to a subset of candidate beams at the apparatus, the beam pair selection measurements including at least self-interference measurements at the apparatus between one or more transmit (Tx) beams and one or more receive (Rx) beams in the subset of candidate beams, wherein the configuration information indicates measurement gaps between the self-interference measurements, wherein the configuration information further indicates an initial measurement gap between a channel measurement and one of the self-interference measurements;
      perform the beam pair selection measurements based on the configuration information;
      select at least one pair of Tx/Rx beams from the subset of candidate beams based on the performed beam pair selection measurements; and
      transmit a report including the selected at least one pair of Tx/Rx beams to the base station.

15. The apparatus of claim 14, wherein the processor configured to perform the beam pair selection measurements is fir the r configured to determine a respective reception timing difference between a downlink (DL) signal and an uplink (UL) signal for each of one or more pairs of Tx/Rx beams from the subset of candidate beams.

16. The apparatus of claim 15, wherein the processor configured to select the at least one pair of Tx/Rx beams is further configured to:
   compare the respective reception timing difference between the DL signal and the UL signal for each of the one or more pairs of Tx/Rx beams to a threshold value; and
   identify pairs of Tx/Rx beams in the one or more pairs of Tx/Rx beams for which the respective reception timing difference between the DL signal and the UL signal is be low the threshold value.

17. The apparatus of claim 16, wherein the threshold value is set to a cyclic prefix duration.

18. The apparatus of claim 15, wherein in order to select the at least one pair of Tx/Rx beams, the processor is further configured to identify a pair of Tx/Rx beams in the one or more pairs of Tx/Rx beams based on at least one constraint applied to the respective reception timing difference between the DL signal and the UL signal.

19. The apparatus of claim 15, wherein the processor configured to determine the respective reception timing difference for each of the one or more pairs of Tx/Rx beams is further configured to:
   determine a first reception time of a downlink trans mis s ion at a receive (Rx) beam of a pair of Tx/Rx beams in the one or more pairs of Tx/Rx beams;
   transmit an uplink transmission from a transmit (Tx) beam of the pair of Tx/Rx beams in the one or more pairs of Tx/Rx beams;
   determine a second reception time of the uplink transmission at the receive (Rx) beam of the pair of Tx/Rx beams in the one or more pairs of Tx/Rx beams; and
   determine a duration between the first reception time and the second reception time.

20. The apparatus of claim 19, wherein the uplink transmission includes a sounding reference signal (SRS).

21. A non-transitory computer-readable medium storing computer-executable code, comprising code for causing a computer to:
   receive, from a base station, configuration information for performing beam pair selection measurements with respect to a subset of candidate beams at a user equipment (UE), the beam pair selection measurements including at least self-interference measurements at the UE between one or more transmit (Tx) beams and one or more receive (Rx) beams in the subset of candidate beams, wherein the configuration information indicates measurement gaps between the self-interference measurements and further indicates an initial measurement gap between a channel measurement and one of the self-interference measurements;

perform the beam pair selection measurements based on the configuration information;

select at least one pair of Tx/Rx beams from the subset of candidate beams based on the performed beam pair selection measurements; and transmit a report including the selected at least one pair of Tx/Rx beams to the base station.

22. A method of wireless communication for a base station (BS), comprising:

transmitting, to a user equipment (UE), configuration information for beam pair selection measurements at the UE with respect to a subset of candidate beams at the UE, the beam pair selection measurements including at least self-interference measurements at the UE between one or more transmit (Tx) beams and one or more receive (Rx) beams in the subset of candidate beams, wherein the configuration information indicates measurement gaps between the self-interference measurements and further indicates an initial measurement gap between a channel measurement and one of the self-interference measurements; and receiving, from the UE, a report including at least one pair of Tx/Rx beams selected by the UE based on the beam pair selection measurements.

23. The method of claim 22, wherein each of the measurement gaps enables the UE to determine a respective reception timing difference between a downlink (DL) signal and an uplink (UL) signal for each of one or more pairs of Tx/Rx beams from the subset of candidate beams.

24. The method of claim 22, further comprising refraining from scheduling downlink transmissions for the UE during the measurement gaps.

25. The method of claim 22, wherein at least one of the measurement gaps enables the UE to perform a beam switching operation.

26. The method of claim 22, wherein the configuration information further indicates a duration for one or more of the measurement gaps.

27. The method of claim 26, wherein the duration is indicated as one or more orthogonal frequency-division multiplexing (OFDM) symbols.

28. The method of claim 27, wherein the duration is indicated to the UE in a radio resource control (RRC) message, a medium access control (MAC) control element (MAC-CE), or in downlink control information (DCI).

29. The apparatus of claim 14, wherein the configuration information further indicates a duration for one or more of the measurement gaps, wherein each of the self-interference measurements are performed via a sounding reference signal (SRS) transmission.

30. The apparatus of claim 29, wherein the duration is indicated as one or more orthogonal frequency-division multiplexing (OFDM) symbols.

* * * * *